(12) United States Patent  (10) Patent No.: US 7,386,869 B1
Bastien et al.  (45) Date of Patent:  Jun. 10, 2008

(54) BROADCAST AND RECEPTION SYSTEMS, AND RECEIVER/DECODER AND REMOTE CONTROLLER THEREFOR

(75) Inventors: Jean-Paul Bastien, Maisse (FR);
Christophe Declerck, Senantes (FR);
Mulham Bayassi, Paris (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/400,447

(22) Filed: Sep. 21, 1999

Related U.S. Application Data

(63) Continuation of application No. PCT/EP97/02117, filed on Apr. 25, 1997.

(30) Foreign Application Priority Data

Mar. 21, 1997 (EP) .................................. 97400650

(51) Int. Cl.
*H04N 7/16* (2006.01)
(52) U.S. Cl. ......................................................... 725/6
(58) Field of Classification Search ................. 725/1–6;
348/734; 235/375, 380, 381, 449, 451, 492, 235/493
See application file for complete search history.

(56) References Cited

U.S. PATENT DOCUMENTS

| | | | |
|---|---|---|---|
| 4,731,842 A | | 3/1988 | Smith |
| 4,849,613 A | * | 7/1989 | Eisele ........................ 235/379 |
| 4,967,366 A | | 10/1990 | Kaehler |
| 5,231,494 A | * | 7/1993 | Wachob .................... 348/385.1 |
| 5,265,162 A | | 11/1993 | Bush et al. |
| 5,351,296 A | * | 9/1994 | Sullivan ....................... 705/70 |
| 5,384,850 A | | 1/1995 | Johnson et al. |
| 5,473,609 A | * | 12/1995 | Chaney ...................... 370/312 |
| 5,475,756 A | * | 12/1995 | Merritt ....................... 340/5.9 |
| 5,491,827 A | * | 2/1996 | Holtey ........................ 711/163 |
| 5,539,824 A | * | 7/1996 | Bjorklund et al. ........... 380/249 |
| 5,561,282 A | | 10/1996 | Price et al. |
| 5,602,581 A | * | 2/1997 | Ozaki ............................. 725/6 |
| 5,603,078 A | * | 2/1997 | Henderson et al. .......... 341/176 |
| 5,644,354 A | * | 7/1997 | Thompson et al. .......... 725/138 |

(Continued)

FOREIGN PATENT DOCUMENTS

EP  0 706 291 A2  4/1996

(Continued)

OTHER PUBLICATIONS

International Search Report issued Nov. 26, 1997, Application No. PCT/EP97/02117, 3 pages.

*Primary Examiner*—Hunter B. Lonsberry
(74) *Attorney, Agent, or Firm*—Osha Liang LLP

(57) ABSTRACT

A receiver/decoder for use in a digital satellite radio or television system includes a decoder and means to accommodate a credit or bank card carrying a microprocessor, and means to interact with said microprocessor when the credit or bank card is inserted into an operative position in said receiver/decoder in order to enable data carried by said credit or bank card to be read and data to be input to the microprocessor carried by said credit or bank card. A PIN number may be transmitted to the receiver/decoder in a secure fashion by means of a remote controller, which is also described. Applications of the invention include Pay-Per-View television, teleshopping and telebanking.

29 Claims, 13 Drawing Sheets

| U.S. PATENT DOCUMENTS | | | | |
|---|---|---|---|---|
| 5,748,908 A | * | 5/1998 | Yu | 705/44 |
| 5,787,154 A | * | 7/1998 | Hazra et al. | 379/93.03 |
| 5,870,155 A | * | 2/1999 | Erlin | 348/734 |
| 6,275,991 B1 | * | 8/2001 | Erlin | 725/141 |
| 6,651,883 B2 | * | 11/2003 | Schilling | 235/380 |

| FOREIGN PATENT DOCUMENTS | | |
|---|---|---|
| WO | EP 0 417 735 B1 | 3/1991 |
| WO | WO95/28059 | 10/1995 |
| WO | WO96/32702 | 10/1996 |

* cited by examiner

BROADCAST AND RECEPTION SYSTEMS, AND RECEIVER/DECODER AND REMOTE CONTROLLER THEREFOR

This application is a continuation of Application No. PCT/EP97/02117, filed Apr. 25, 1997.

BACKGROUND OF THE INVENTION

1. Field of the Invention

The present invention relates to a broadcast and reception system, in particular (but not exclusively) to a mass-market digital interactive satellite television system. It also relates to a receiver/decoder and a remote controller therefor.

2. Background Art

More particularly the present invention relates in a main aspect to a so-called pay radio and/or television system where a user/viewer selects a programme/film/game to be viewed for which payment is to be made, this being referred to as a Pay-Per-View (PPV) event or in the case of data to be downloaded a so-called Pay-Per-File (PPF) event.

With such known PPV or PPF systems the end user/viewer is required to interact initially with the system in order not only to select a product to be delivered but also in some cases to effect payment for such delivery. The term "product" is here used to denote any programme, film or other event or data to be transmitted either to the end user's television set or personal computer associated with the system.

The invention also relates to a tele-shopping system or a tele-banking system in which a credit or bank card is used in conjunction with broadcast information to effect a transaction, for example purchase of an advertised item or service.

BRIEF SUMMARY OF THE INVENTION

The present invention provides apparatus including a receiver/decoder for use in reception of a television or radio programme or a data file, the apparatus including means for interacting with a user's credit or bank card to read information carried by the card.

Such an arrangement may facilitate payment for products, with minimal interaction required by a user.

The bank or credit card may carry the data on a magnetic stripe (or other "passive" data carrier). However, most preferably, the credit or bank card incorporates a microprocessor (or other "active" information storage device) and the apparatus is arranged to interact with the microprocessor, and preferably is arranged to provide information to the microprocessor. This may enable a higher level of security to be maintained, and may facilitate transfer of information.

The apparatus preferably further includes means for transmitting to a remote centre a debit instruction, based on the information carried by the card, to effect debiting of the user's credit or bank account.

In one preferred arrangement, the apparatus is preferably arranged to receive authorization information from the remote centre, and to control decoding and/or descrambling of the programme or file in dependence on the authorization information. This may facilitate provision of PPV or PPF services.

In a preferred arrangement, the apparatus further includes means for interacting with a smartcard containing subscriber information, decoding or descrambling being controlled in dependence on the subscriber information. The smartcard may also contain decryption key information and information concerning channels to which the user has subscribed.

Preferably, the apparatus is arranged to store reception credit information representing credits available for purchase of products in memory means of the smartcard, and it preferably includes means to modify the reception credit information to reduce the available credits by a determined amount in response to reception of a programme or file. In this way, a user can store credits for purchase of products (PPV programmes or PPF files) on the smartcard.

In a preferred arrangement, the apparatus is arranged to send debit instructions, preferably on request by a user, to the remote centre, and to modify the reception credit information stored in the smartcard, preferably on receipt of authorization information, to increase the number of credits stored on the smartcard in dependence on payment by means of the bank or credit card. In this way, a user can purchase credits using a bank or credit card, to be stored on the smartcard for later use.

Most preferably, the apparatus is arranged to effect purchase of reception credits sufficient to allow a plurality of products to be purchased for each transaction in which a debit instruction is sent to the remote centre; this may reduce the number of transactions required with the remote centre, and may improve security by reducing the number of occasions on which the bank or credit card details need to be transmitted.

In an arrangement particularly suitable for tele-shopping, the apparatus includes means for processing data representative of the user's bank or credit card together with received data representative of an item or service offered, and for transmitting an order request to a remote centre for processing. With such a system, ordering and paying for advertised products may be simplified. Preferably means are provided for inputting a request from a user to purchase a displayed product or service; this may simplify purchasing to the extent of only requiring a user to confirm they wish to purchase a specified item.

The apparatus may further include means for receiving a Personal Identification Number (PIN), preferably associated with the credit or bank card, preferably transmitted from a remote controller in a secure fashion, to authorise a transaction.

The apparatus preferably takes the form of a set-top-box (STB), that is preferably a self-contained unit containing both decoder and card reading circuitry. The apparatus may, however, be integrated into a television, video recorder, or computer apparatus.

The invention is most preferably applied to reception of satellite transmitted programmes and files, and in particular digital satellite programmes, as these afford useful capacity for transmission of data, although of course it is also applicable to cable and terrestrial use.

A particularly preferred feature is that the apparatus includes a further interacting means, for interacting with a user's (additional) card to read information carried by the card, said means being separate from said means for interacting with a user's credit or bank card. By providing effectively two card readers, the usefulness of the apparatus can be further increased.

This important aspect is provided independently. Hence, according to a related aspect of the present invention, there is provided apparatus including a receiver/decoder for use in reception of a television or radio programme or a data file, the apparatus including means for interacting with a user's credit or bank card to read information carried by the card, and, separate from said means, a further interacting means, for interacting with a user's card to read information carried by the card.

Preferably, the further interacting means is arranged to interact with a card incorporating a microprocessor, and the card is a so-called "smartcard". More preferably, the apparatus is arranged to provide information to the microprocessor.

According to a further aspect of the present invention a receiver/decoder for use in a digital satellite television system includes a decoder and means to accommodate a credit or bank card carrying a microprocessor, and means to interact with said microprocessor when the credit or bank card is inserted into an operative position in said receiver/decoder in order to enable data carried by said credit or bank card to be read and data to be input to the microprocessor carried by said credit or bank card.

According to a preferred feature of this further aspect of the present invention the receiver/decoder also includes means to accommodate a smartcard whereby insertion of the smartcard by the end user into the receiver/decoder enables the smartcard to interact in said receiver/decoder whereby a product selected by the end user may be delivered to said receiver/decoder and from there to a television set or personal computer to which the receiver/decoder is adapted to be connected.

According to another aspect of the present invention, there is provided a digital satellite radio or television system having a plurality of end user terminations each of which includes a receiver/decoder as defined in either of the previous two paragraphs.

The invention further provides use of a credit card or bank card reader in conjunction with apparatus for receiving or decoding radio or television signals, preferably satellite television signals, to provide information enabling a user's credit or bank account to be debited on demand for a programme, file, item or service offered.

In a method aspect, the invention provides a method of displaying a programme or making available a file for downloading, comprising, at a receiver/decoder at which information concerning the programme or file is received, reading information from a bank or credit card, determining whether a user is authorised to receive the program or file, and, if authorised, displaying the program or making the file available and issuing a debit instruction to debit the user's credit or bank account. In the preferred embodiment, in fact, the debiting from the user's credit or bank account is usually carried out before displaying the program or making the file available.

In a further method aspect, the invention provides a method of providing an order for an item or service comprising, at a receiver/decoder at which information concerning the item or service is received, reading information from a bank or credit card, generating an order request containing information identifying the item or service and information representative of the bank or credit card information, and transmitting order information to a remote centre for processing.

The method preferably further comprises, at the remote centre, processing the order information and determining whether to authorise the transaction on the basis of the bank or credit card information.

Relating to the apparatus as aforesaid, preferably the apparatus further comprises a remote controller for transmitting a user's Personal Identification (PIN) Number to the receiver/decoder. More preferably, the remote controller includes security means for rendering the transmission secure. These features are now discussed in more detail.

In the aspect of the invention now described, the present invention also relates to a remote controller for an item of equipment and more particularly to a hand-held remote controller used to control television sets, receiver/decoders for satellite television systems, and other such equipment.

Such controllers operate on the basis of transmitting a signal from the hand-held controller to the item of equipment, one way of doing this being by means of an infra-red beam.

As discussed earlier, in order to enable a user to carry out shopping and banking transactions through the medium of a television system it would be necessary for the user to input a so-called Personal Identification Number (PIN) in order to execute the financial transaction. The PIN number of a user must of course be kept confidential to that particular user so that third parties cannot remove funds from that user's bank account in an unauthorised manner. With known remote controllers, the information transmitted from the handset to the television set can be intercepted; this presents a problem if confidential data is to be transmitted. The present invention aims to alleviate this problem, whilst keeping the nature of operations to be carried out by the user as simple as possible.

This aspect of the present invention is concerned particularly with providing a hand-held remote controller which will be capable of being used with a television system through which banking and other financial transactions may be carried out.

According to this aspect of the present invention a remote controller for an item of equipment has means by which a user's Personal Identification Number may be transmitted to the item of equipment, the controller incorporating security means for rendering said transmission secure.

In a closely related aspect, the invention provides a remote controller for an item of equipment, comprising means defining a body for said controller, means for transmitting a user's Personal Identification Number to said item of equipment and security means for rendering said transmission secure.

Preferably, the transmission means comprises means for generating an infra-red beam; this provides a convenient means of transmission, which may be less liable to interception than other transmission media.

The security means preferably comprises means for encrypting the PIN number; this may inhibit detection of the PIN number if the transmission is intercepted.

The encryption means may comprise means for combining the PIN number with a random number (or a pseudo-random number); this may render unauthorised decryption more difficult.

Means for enabling the user to input the random number may be provided; provision of user input may render input of the random number less prone to interception.

Conveniently, the input means comprises at least one key for input of the random number and a further key, the controller being arranged such that the PIN number is only transmitted via the transmitting means on depression of the further key. Such an arrangement may be simple to operate, but reliable, compact and secure.

Usefully, the encryption means comprises means for storing the random number in the controller; this facilitates coding of a subsequently input PIN number.

The security means may comprise means for generating a number characteristic of the individual controller, for transmission via said transmitting means to the item of equipment. Such an arrangement may offer higher security, and may also serve to prevent use of unauthorised remote controllers.

Similarly, to increase security, the encryption means may include means for generating a number characteristic of the individual remote controller and means for combining said characteristic number with said random number and said PIN number.

In a preferred arrangement, the encryption means comprises means for receiving a random number from said item of equipment and means for combining that random number with the user's PIN number for transmission via the transmitting means to said item. This may render encryption more secure, by providing a random number only when needed for encryption.

The controller preferably also comprises means for transmitting control commands for the equipment, and preferably has input means selectively operable, in dependence on an input state of the remote controller, either to input said PIN number or to input a control command for the equipment, the input state preferably being set in accordance with further input means. The input means may comprise a numeric input key and the control command may comprise a program or channel selection command. The further input means may comprise a further function key.

The invention also provides a combination comprising a remote controller as claimed in any one of the preceding claims and said item of equipment, said item of equipment having means for receiving a user's PIN number.

In such a combination, the item of equipment may comprise means for generating a random number and means for outputting said random number to a display unit; this facilitates input of a random number at the time of encryption.

The item of equipment may comprise means for generating a random number and means for transmitting said random number to said remote controller; this may avoid the need for manual entry of the random number.

A further aspect of the invention provides a digital television system, comprising an item of television equipment, said item having means for receiving a user's PIN number, and a remote controller as defined above.

A closely related further aspect provides a digital television system, comprising an item of television equipment, said item having means for receiving a PIN number, and a remote controller, said remote controller comprising means defining a body for said controller, means for transmitting a user's PIN number to said item of equipment and security means for rendering said transmission secure.

The item of television equipment may be a television set or a receiver/decoder to be coupled to a television set.

The invention also extends to a method of entering a PIN number into a television system comprising employing a remote controller as defined above.

BRIEF DESCRIPTION OF THE FIGURES

Preferred features of the present invention will now be described, purely by way of example, with reference to the accompanying drawings in which.

DETAILED DESCRIPTION OF THE INVENTION

Figure 1:
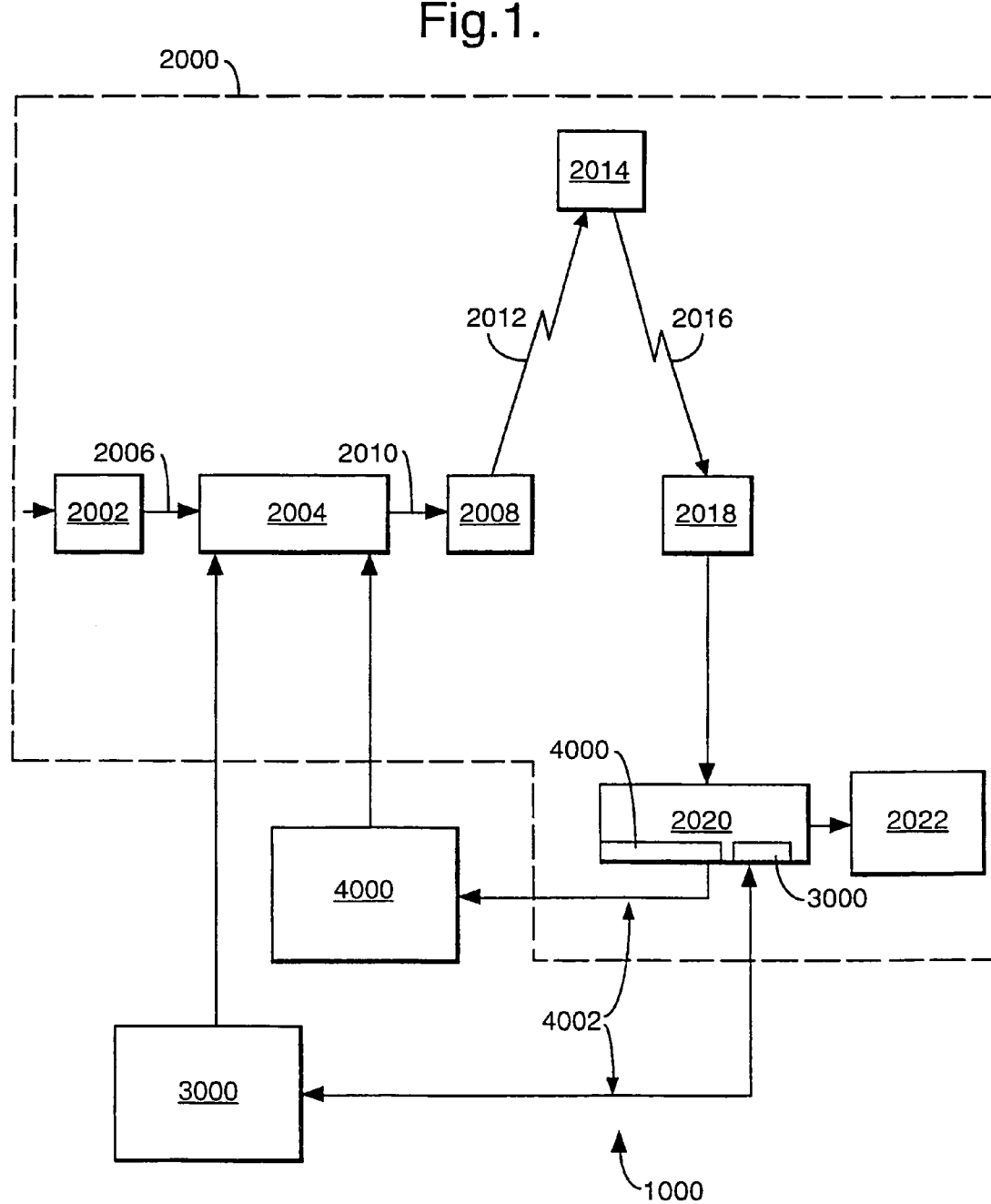
FIG. 1 shows the overall architecture of a digital television system according to the preferred embodiment of the present invention.

An overview of a digital television broadcast and reception system 1000 according to the present invention is shown in FIG. 1. The invention includes a mostly conventional digital television system 2000 which uses the known MPEG-2 compression system to transmit compressed digital signals. In more detail, MPEG-2 compressor 2002 in a broadcast centre receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecom links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television set 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smartcard, capable of decrypting messages relating to commercial offers (that is, one or several television programmes sold by the broadcast supplier), can be inserted into the receiver/decoder 2020. Using the decoder 2020 and smartcard, the end user may purchase events in either a subscription mode or a pay-per-view mode.

An interactive system 4000, also connected to the multiplexer 2004 and the receiver/decoder 2020 and again located partly in the broadcast centre and partly in the decoder, enables the end user to interact with various applications via a modemmed back channel 4002.

Conditional Access System

The conditional access system 3000 is now described in more detail.

Figure 2:
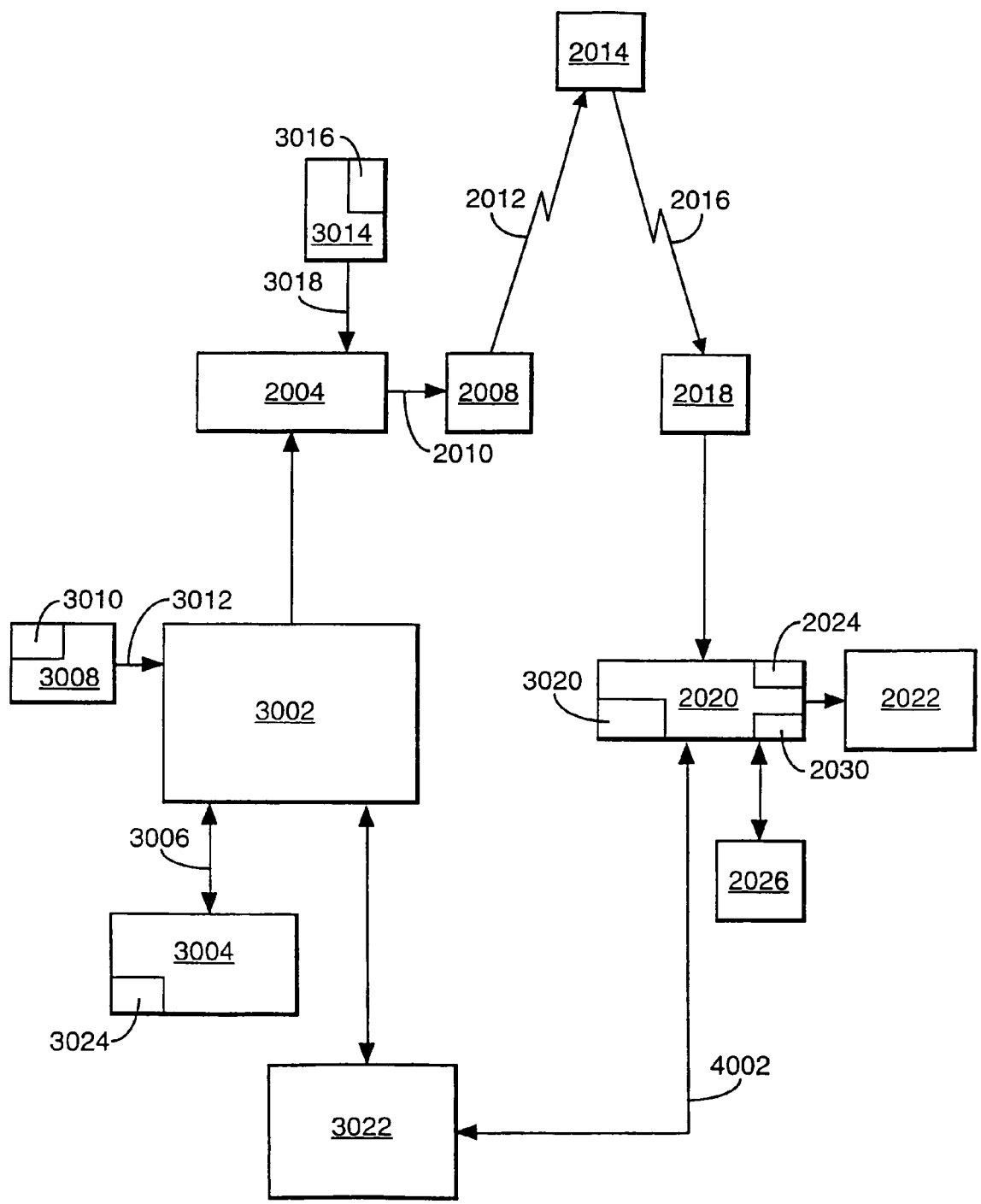
FIG. 2 shows the architecture of a conditional access system of the digital television system.

With reference to FIG. 2, in overview the conditional access system 3000 includes a Subscriber Authorization System (SAS) 3002. The SAS 3002 is connected to one or more Subscriber Management Systems (SMS) 3004, one SMS for each broadcast supplier, by a respective TCP-IP linkage 3006

(although other types of linkage could alternatively be used). Alternatively, one SMS could be shared between two broadcast suppliers, or one supplier could use two SMSs, and so on.

First encrypting units in the form of ciphering units 3008 utilising "mother" smartcards 3010 are connected to the SAS by linkage 3012. Second encrypting units again in the form of ciphering units 3014 utilising mother smartcards 3016 are connected to the multiplexer 2004 by linkage 3018. The receiver/decoder 2020 receives a "daughter" smartcard 3020. It is connected directly to the SAS 3002 by Communications Servers 3022 via the modemmed back channel 4002. The SAS sends amongst other things subscription rights to the daughter smartcard on request.

The smartcards contain the secrets of one or more commercial operators. The "mother" smartcard encrypts different kinds of messages and the "daughter" smartcards decrypt the messages, if they have the rights to do so.

The first and second ciphering units 3008 and 3014 comprise a rack, an electronic VME (VME being an ICL proprietary operating system) card with software stored on an EEPROM, up to 20 electronic cards and one smartcard 3010 and 3016 respectively, for each electronic card, one (card 3016) for encrypting the ECMs and one (card 3010) for encrypting the EMMs.

The operation of the conditional access system 3000 of the digital television system will now be described in more detail with reference to the various components of the television system 2000 and the conditional access system 3000.

Multiplexer and Scrambler

With reference to FIGS. 1 and 2, in the broadcast centre, the digital video signal is first compressed (or bit rate reduced), using the MPEG-2 compressor 2002. This compressed signal is then transmitted to the multiplexer and scrambler 2004 via the linkage 2006 in order to be multiplexed with other data, such as other compressed data.

The scrambler generates a control word used in the scrambling process and included in the MPEG-2 stream in the multiplexer 2004. The control word is generated internally and enables the end user's integrated receiver/decoder 2020 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the preferred embodiment, up to 960 commercial offers may be selected from a bouquet of channels. In the Pay Per View mode, the end user is provided with the capability to purchase events as he wishes. This can be achieved by either pre-booking the event in advance ("prebook mode"), or by purchasing the event as soon as it is broadcast ("impulse mode"). In the preferred embodiment, all users are subscribers, whether or not they watch in subscription or PPV mode, but of course PPV viewers need not necessarily be subscribers.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 3014 via the linkage 3018. In this unit, an ECM is generated, encrypted and transmitted on to the multiplexer and scrambler 2004.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast to the transponder 2014. In respect of each scrambled component of the service, a separate ECM is required.

Programme Transmission

The multiplexer 2004 receives electrical signals comprising encrypted EMMs from the SAS 3002, encrypted ECMs from the second encrypting unit 3014 and compressed programmes from the compressor 2002. The multiplexer 2004 scrambles the programmes and transmits the scrambled programmes, the encrypted EMMs and the encrypted ECMs as electric signals to a transmitter 2008 of the broadcast centre via linkage 2010. The transmitter 2008 transmits electromagnetic signals towards the satellite transponder 2014 via uplink 2012.

Programme Reception

The satellite transponder 2014 receives and processes the electromagnetic signals transmitted by the transmitter 2008 and transmits the signals on to the earth receiver 2018, conventionally in the form of a dish owned or rented by the end user, via downlink 2016. The signals received by receiver 2018 are transmitted to the integrated receiver/decoder 2020 owned or rented by the end user and connected to the end user's television set 2022. The receiver/decoder 2020 demultiplexes the signals to obtain scrambled programmes with encrypted EMMs and encrypted ECMs.

If the programme is not scrambled, that is, no ECM has been transmitted with the MPEG-2 stream, the receiver/decoder 2020 decompresses the data and transforms the signal into a video signal for transmission to television set 2022.

If the programme is scrambled, the receiver/decoder 2020 extracts the corresponding ECM from the MPEG-2 stream and passes the ECM to the "daughter" smartcard 3020 of the end user. This slots into a housing in the receiver/decoder 2020. The daughter smartcard 3020 controls whether the end user has the right to decrypt the ECM and to access the programme. If not, a negative status is passed to the receiver/decoder 2020 to indicate that the programme cannot be descrambled. If the end user does have the rights, the ECM is decrypted and the control word extracted. The decoder 2020 can then descramble the programme using this control word. The MPEG-2 stream is decompressed and translated into a video signal for onward transmission to television set 2022.

Subscriber Management System (SMS)

A Subscriber Management System (SMS) 3004 includes a database 3024 which manages, amongst others, all of the end user files, commercial offers (such as tariffs and promotions), subscriptions, PPV details, and data regarding end user consumption and authorization. The SMS may be physically remote from the SAS.

Each SMS 3004 transmits messages to the SAS 3002 via respective linkage 3006 which imply modifications to or creations of Entitlement Management Messages (EMMs) to be transmitted to end users.

The SMS 3004 also transmits messages to the SAS 3002 which imply no modifications or creations of EMMs but imply only a change in an end user's state (relating to the authorization granted to the end user when ordering products or to the amount that the end user will be charged).

As described later, the SAS 3002 sends messages (typically requesting information such as call-back information or billing information) to the SMS 3004, so that it will be apparent that communication between the two is two-way.

Entitlement Management Messages (EMMs)

The EMM is a message dedicated to an individual end user (subscriber), or a group of end users, only (in contrast with an ECM, which is dedicated to one scrambled programme only or a set of scrambled programmes if part of the same commercial offer). Each group may contain a given number of end users. This organisation as a group aims at optimising the bandwidth; that is, access to one group can permit the reaching of a great number of end users.

Various specific types of EMM are used in putting the present invention into practice. Individual EMMs are dedicated to individual subscribers, and are typically used in the provision of Pay Per View services; these contain the group identifier and the position of the subscriber in that group. So-called "Group" subscription EMMs are dedicated to groups of, say, 256 individual users, and are typically used in the administration of some subscription services. This EMM has a group identifier and a subscribers' group bitmap. Audience EMMs are dedicated to entire audiences, and might for example be used by a particular operator to provide certain free services. An "audience" is the totality of subscribers having smartcards which bear the same Operator Identifier (OPI). Finally, a "unique" EMM is addressed to the unique identifier of the smartcard.

Figure 3:
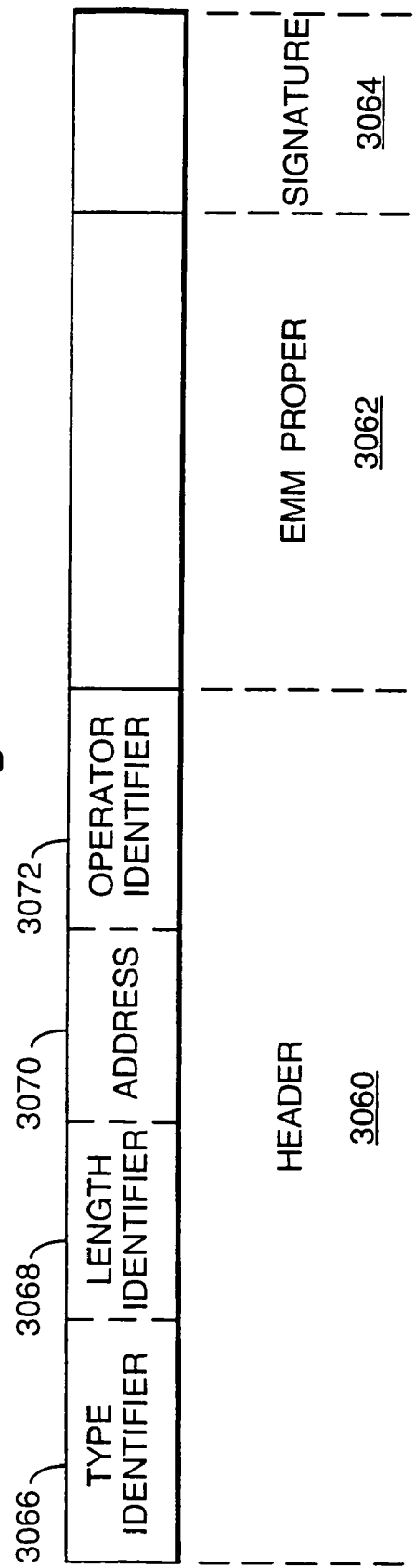
FIG. 3 shows the structure of an Entitlement Management Message used in the conditional access system.

The structure of a typical EMM is now described with reference to FIG. 3. Basically, the EMM, which is implemented as a series of digital data bits, comprises a header 3060, the EMM proper 3062, and a signature 3064. The header 3060 in turn comprises a type identifier 3066 to identify whether the type is individual, group, audience or some other type, a length identifier 3068 which gives the length of the EMM, an optional address 3070 for the EMM, an operator identifier 3072 and a key identifier 3074. The EMM proper 3062 of course varies greatly according to its type. Finally, the signature 3064, which is typically of 8 bytes long, provides a number of checks against corruption of the remaining data in the EMM.

Subscriber Authorization System (SAS)

The messages generated by the SMS 3004 are passed via linkage 3006 to the Subscriber Authorization System (SAS) 3002, which in turn generates messages acknowledging receipt of the messages generated by the SMS 3004 and passes these acknowledgements to the SMS 3004.

Figure 4:
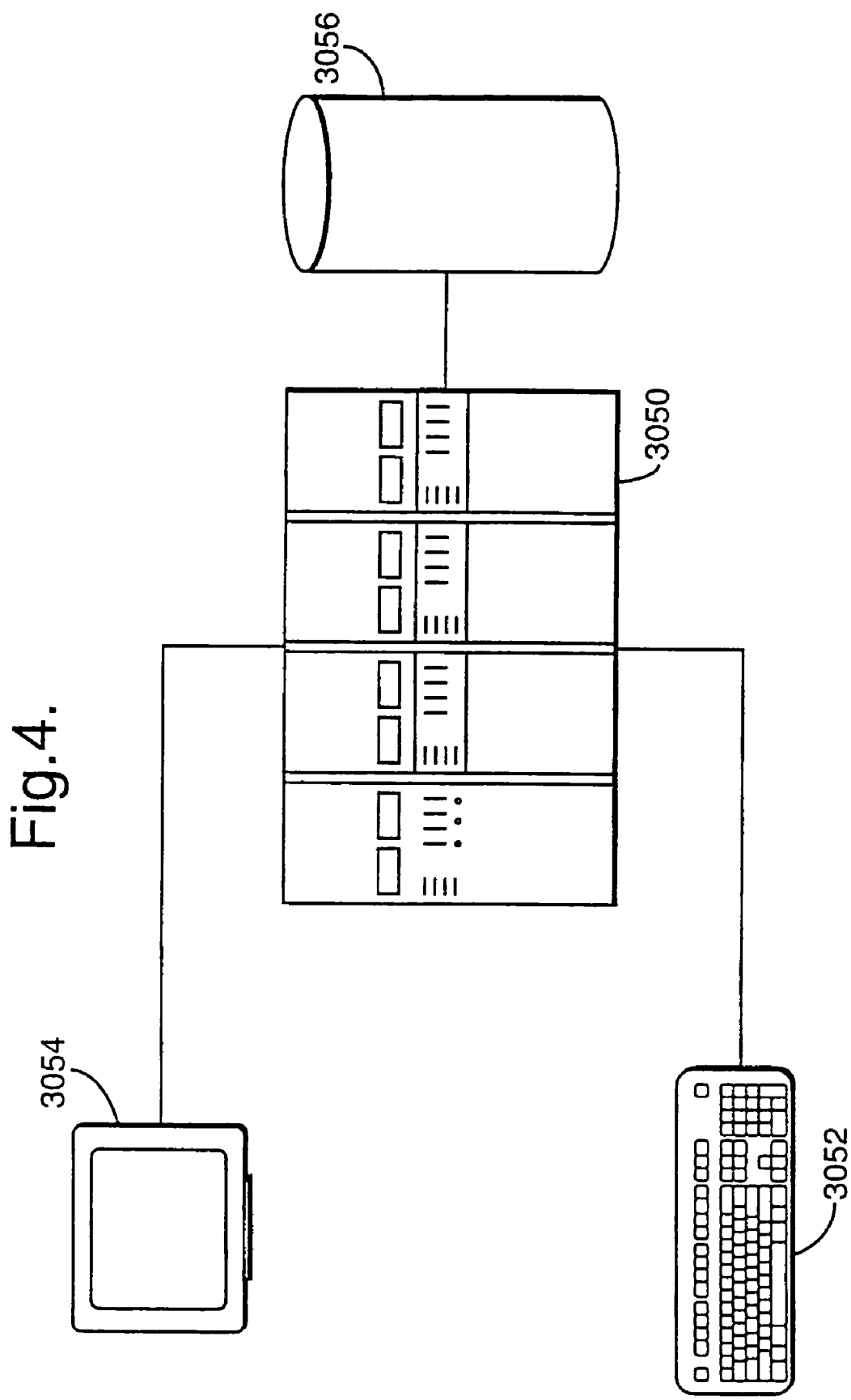
FIG. 4 is a schematic diagram of the hardware of a Subscriber Authorization System (SAS) according to a preferred embodiment of the present invention.

As shown in FIG. 4, at the hardware level the SAS comprises in known fashion a mainframe computer 3050 (in the preferred embodiment a DEC machine) connected to one or more keyboards 3052 for data and command input, one or more Visual Display Units (VDUs) 3054 for display of output information and data storage means 3056. Some redundancy in hardware may be provided.

Figure 5:
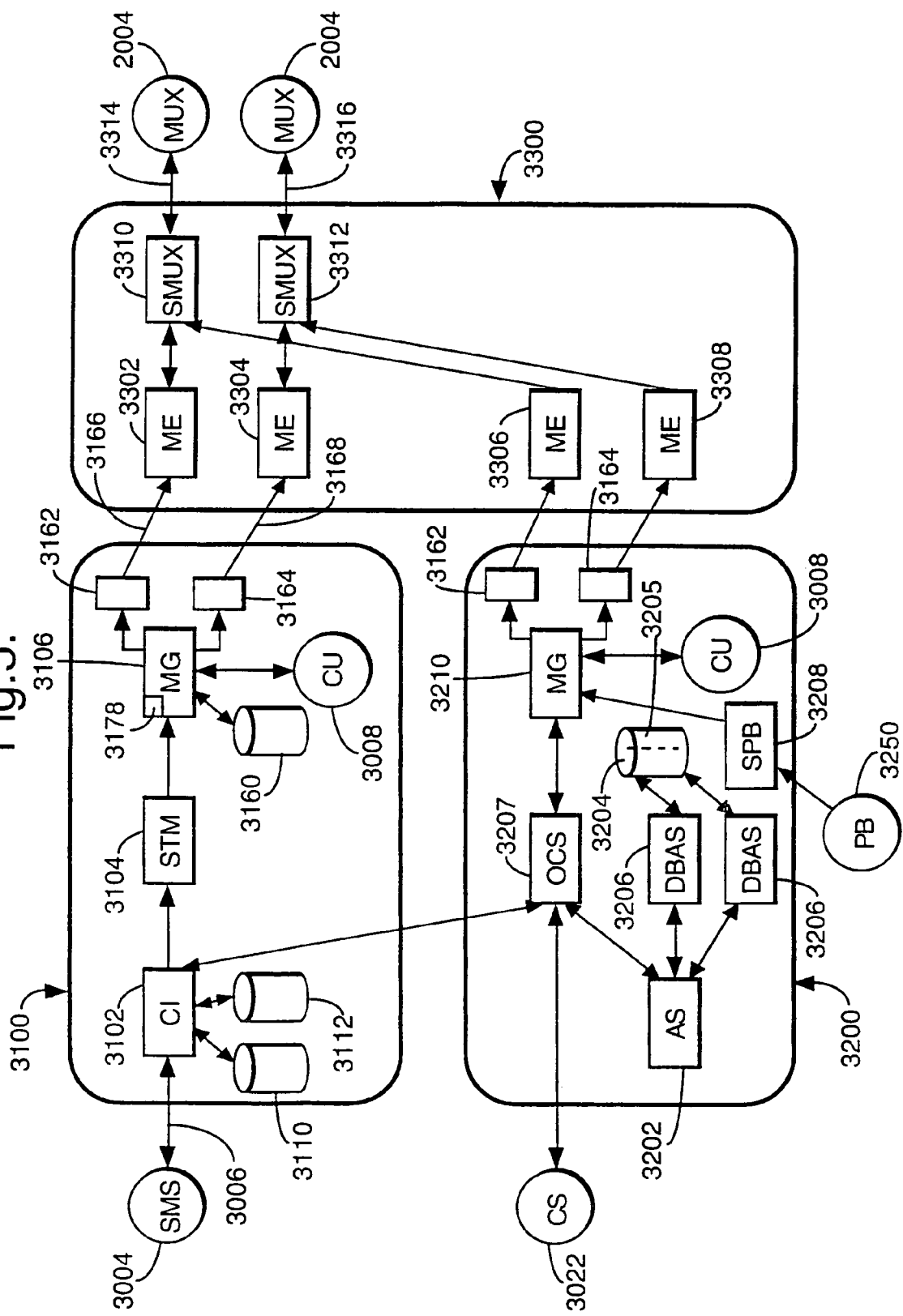
FIG. 5 is a schematic diagram of the architecture of the SAS.

At the software level the SAS runs, in the preferred embodiment on a standard open VMS operating system, a suite of software whose architecture is now described in overview with reference to FIG. 5; it will be understood that the software could alternatively be implemented in hardware.

In overview the SAS comprises a Subscription Chain area 3100 to give rights for subscription mode and to renew the rights automatically each month, a Pay Per View Chain area 3200 to give rights for PPV events, and an EMM Injector 3300 for passing EMMs created by the Subscription and PPV chain areas to the multiplexer and scrambler 2004, and hence to feed the MPEG stream with EMMs. If other rights are to be granted, such as Pay Per File (PPF) rights in the case of downloading computer software to a user's Personal Computer, other similar areas are also provided.

One function of the SAS 3002 is to, manage the access rights to television programmes, available as commercial offers in subscription mode or sold as PPV events according to different modes of commercialisation (pre-book mode, impulse mode). The SAS 3002, according to those rights and to information received from the SMS 3004, generates EMMs for the subscriber.

The Subscription Chain area 3100 comprises a Command Interface (CI) 3102, a Subscriber Technical Management (STM) server 3104, a Message Generator (MG) 3106, and the Ciphering Unit 3008.

The PPV Chain area 3200 comprises an Authorization Server (AS) 3202, a relational database 3204 for storing relevant details of the end users, a local blacklist database 3205, Database Servers 3206 for the database, an Order Centralized Server (OCS) 3207, a Server for Programme Broadcaster (SPB) 3208, a Message Generator (MG) 3210 whose function is basically the same as that for the Subscription Chain area and is hence not described further in any detail, and the Ciphering Unit 3008.

The EMM Injector 3300 comprises a plurality of Message Emitters (MEs) 3302, 3304, 3306 and 3308 and Software Multiplexers (SMUXs) 3310 and 3312. In the preferred embodiment, there are two MEs, 3302 and 3304 for the Message Generator 3106, with the other two MEs 3306 and 3308 for the Message Generator 3210. MEs 3302 and 3306 are connected to the SMUX 3310 whilst MEs 3304 and 3308 are connected to the SMUX 3312.

Interactive System

An interactive system 4000, also connected to the multiplexer 2004 and the receiver/decoder 2020 and again located partly in the broadcast centre and partly in the decoder, enables the end user to interact with various applications via a modemmed back channel 4002.

Figure 6:
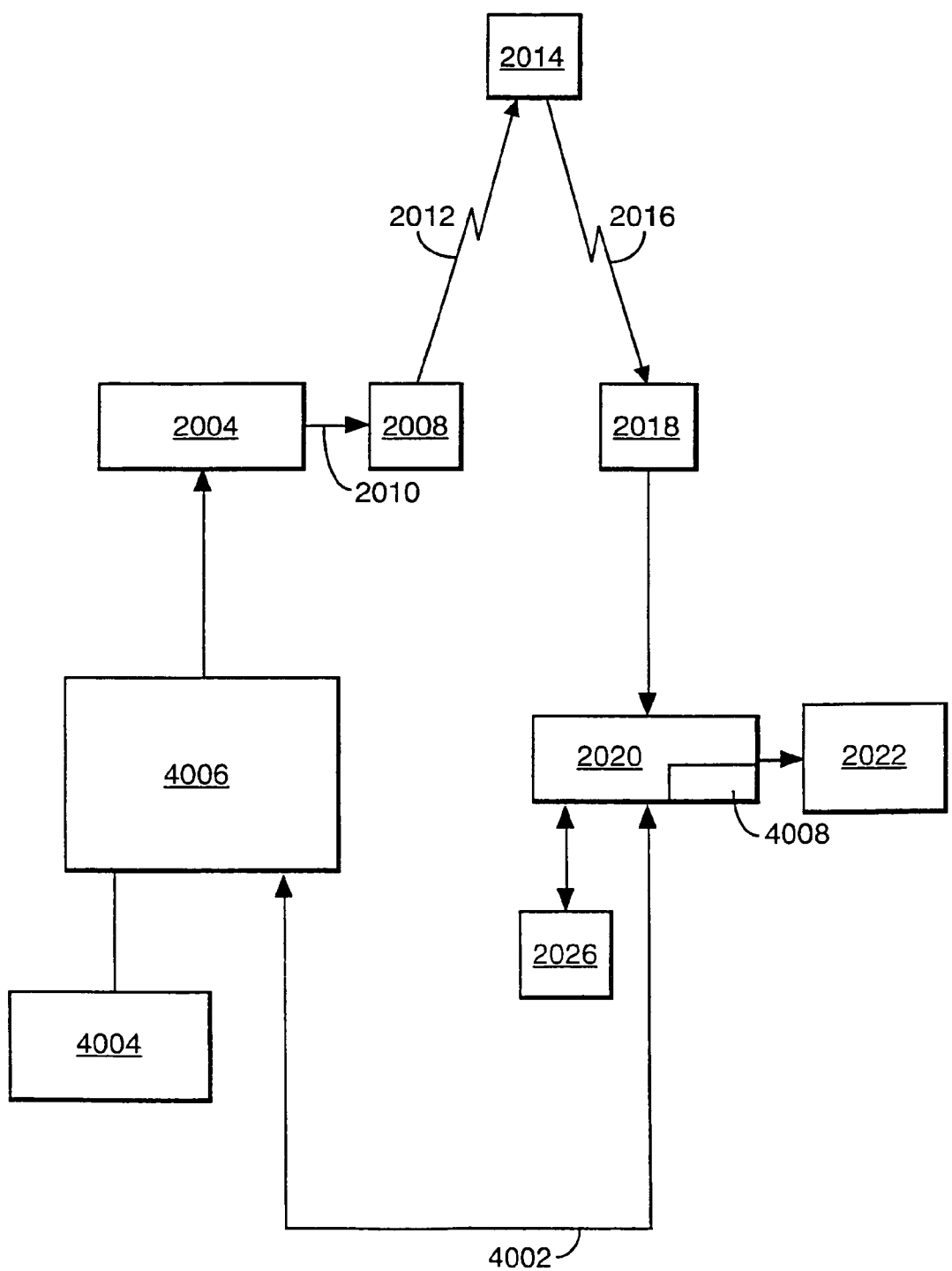
FIG. 6 shows the architecture of an interactive system of the digital television system of FIG. 1.

FIG. 6 shows the general architecture of the interactive television system 4000 of the digital television system 1000 of the present invention.

The interactive system 4000 comprises in overview four main elements:

an authoring tool 4004 at the broadcast centre (or elsewhere) for enabling a broadcast supplier to create, develop, debug and test applications;

an application and data server 4006 the broadcast centre, connected to the authoring tool 4004 for enabling a broadcast supplier to prepare, authenticate and format applications and data for delivery to the multiplexer and scrambler 2004 for insertion into the MPEG-2 transport stream (typically the private section thereof) to be broadcast to the end user;

a virtual machine including a run time engine (RTE) 4008, which is an executable code installed in the receiver/decoder 2020 owned or rented by the end user for enabling an end user to receive, authenticate, decompress, and load applications into the working memory 2024 of the receiver/decoder 2020 for execution. The engine 4008 also runs resident, general-purpose applications. The engine 4008 is independent of the hardware and operating system; and a modemmed back channel 4002 between the receiver/decoder 2020 and the application and data server 4006 to enable signals instructing the server 4006 to insert data and applications into the MPEG-2 transport stream at the request of the end user.

The interactive television system operates using "applications" which control the functions of the receiver/decoder and various devices contained therein. Applications are represented in the engine 4008 as "resource files". A "module" is a set of resource files and data. Several modules may be required to make up an application. A "memory volume" of the receiver/decoder is a storage space for modules. An "interface" is used to download modules. Modules may be downloaded into the receiver/decode 2020 from the MPEG-2 transport stream.

For the purposes of this specification, an application is a piece of computer code for controlling high level functions of preferably the receiver/decoder 2020. For example, when the end user positions the focus of a remote controller 2026 (as shown in more detail in FIG. 7) on a button object seen on the screen of the television set 2022 and presses a validation key, the script associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 2020, or broadcast and downloaded into the RAM or FLASH memory of the receiver/decoder 2020.

Examples of applications are:—

An Initiating Application. The receiver/decoder 2020 is equipped with a resident initiating application which is an adaptable collection of modules (this term being defined in more detail hereunder) enabling the receiver/decoder 2020 to be immediately operative in the MPEG-2 environment. The application provides core features which can be modified by the broadcast supplier if required. It also provides an interface between the resident application and downloaded applications.

A Startup Application. The startup application allows any application, either downloaded or resident, to run on the receiver/decoder 2020. This application acts as a bootstrap executed on arrival of a service in order to start the application. Startup is downloaded into RAM and therefore can be updated easily. It can be configured so that the interactive applications available on each channel can be selected and run, either immediately after downloading or after preloading. In the case of preloading, the application is loaded into the memory 2024 and is activated by the startup when required.

A Program Guide. The Program Guide is an interactive application which gives full information about programming. For example, it may give information about, say, one week's television programmes provided on each channel of a digital television bouquet. By depressing a key on the remote controller 2026, the end user accesses an add-on screen, overlaid on the event shown on the screen of the television set 2022. This add-on screen is a browser giving information on the current and next events of each channel of the digital TV bouquet. By depressing another key on the remote controller 2026, the end user accesses an application which displays a list of information on events over one week. The end user can also search and sort events with simple and customised criteria. The end user can also access directly a selected channel.

A Pay Per View application. The Pay Per View Application is an interactive service available on each PPV channel of the digital TV bouquet in conjunction with the conditional access system 3000. The end user can access the application using a TV guide or channel browser. Additionally, the application starts automatically as soon as a PPV event is detected on the PPV channel. The end user is then able to buy the current event either through his daughter smartcard 3020 or via the communication server 3022 (using a modem, a telephone and DTMF codes, MINITEL or the like). The application may be either resident in the ROM of the receiver/decoder 2020 or downloadable into the RAM of the decoder 2020.

A PC Download application. On request, an end user can download computer software using the PC download application.

A Magazine Browser application. The magazine browser application comprises a cyclic video broadcast of images with end user navigation via on-screen buttons.

A Quiz application. The quiz application is preferably synchronised with a broadcast quiz programme. As an example, multiple choice questions are displayed on the screen of the television 2022, and the user can select an answer using the remote controller 2026. The quiz application can inform the user whether the answer is correct or not, and can keep count of the user's score.

A Teleshopping application. In one example of the teleshopping application, offers of goods for sale are transmitted to the receiver/decoder 2020 and displayed on the television 2022. Using the remote controller, the user can select a particular item to buy. The order for the item is sent via the modemmed back channel 4002 to the application and data server 4006 or to a separate sales system the telephone number of which has been downloaded to the receiver/decoder, possibly with an order to debit the account for a credit card which has been inserted into one of the card readers 4036 of the receiver/decoder 2020.

A Telebanking application. In one example of the telebanking application, the user inserts a bank card into one of the card readers 4036 of the receiver/decoder 2020. The receiver/decoder 2020 dials up the user's bank, using a telephone number stored in the bank card or stored in the receiver/decoder, and then the application provides a number of facilities which can be selected using the remote controller 2026, for example for downloading via the telephone line a statement of account, transferring funds between accounts, requesting a cheque book, etc.

An Internet Browser application. In one example of the Internet browser application, instructions from the user, such as a request to view a web page having a particular URL, are entered using the remote controller 2026, and these are sent by the modemmed back channel 4002 to the application and data server 4006. The appropriate web page is then included in the transmissions from the broadcast centre, received by the receiver/decoder 2020 via the uplink 2012, transponder 2014 and downlink 2016, and displayed on the television 2022.

Applications are stored in memory locations in the receiver/decoder 2020 and represented as resource files. The resource files comprise graphic object description unit files, variables block unit files, instruction sequence files, application files and data files.

The graphic object description unit files describe the screens, the man-machine interface of the application. The variables block unit files describe the data structures handled by the application. The instruction sequence files describe the processing operations of the applications. The application files provide the entry points for the applications.

The applications constituted in this way can use data files, such as icon library files, image files, character font files, colour table files and ASCII text files. An interactive application can also obtain on-line data by effecting inputs and/or outputs.

The engine 4008 only loads into its memory those resource files it needs at a given time. These resource files are read from the graphic object description unit files, instruction sequence files and application files; variables block unit files are stored in memory following a call to a procedure for loading modules and remain locked there until a specific call to a procedure for unloading modules is made.

Credit Card Facility for Set-Top-Box

Figure 8:
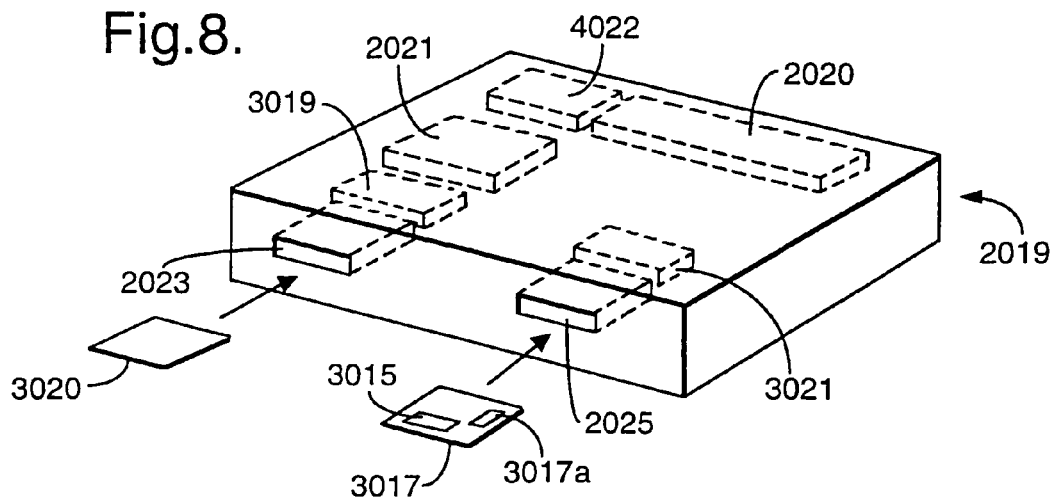
FIG. 8 is a diagrammatic perspective view of a receiver/decoder according to the present invention.

With reference to FIG. 8, each end user of the system described with reference to the preceding figures is provided with a set-top-box 2019 including a receiver/decoder 2020 by which the end user can interact with the digital satellite television system and by means of which products selected by the end user can be transmitted to the user's television set 2022 or the user's personal computer for downloading onto it.

The set-top-box 2019 houses, among other items, the decoder 2020 and the modem 2021, the decoder 2020 including a memory 4022.

Slots 2023 and 2025 are provided in the front of the set-top-box 2019 into which a smartcard 3020 and/or credit/bank card 3017 may be inserted, respectively. The slots 2023 and 2025 have card reading means 3019 and 3021 associated with them respectively.

The way in which the "daughter" smartcard which is specific to a particular user interacts with the system has already been described with reference to FIG. 2.

With this embodiment of the present invention the end user has the option of paying for a selected product by means of a credit/bank card, preferably of the type which incorporates a microprocessor 3017a (a so-called "smartcard"), typically in the PPV and PPF modes of operation of the system.

This use of a credit/bank card is made possible by providing the set-top-box 2019 with the slot 2015 and associated means within the receiver/decoder to enable the microprocessor 3017a to interact with the system as a whole.

The receiver/decoder in this embodiment includes a conventional card-reader device, which is under overall control by the same processor which oversees control of decoding and controls interaction with the smartcard. In this way, debit instructions can readily be linked to "charging" of the smartcard with additional credits.

This interaction involves the credit/bank card in effect being interrogated to establish its authenticity, expiry date and whether the credit limit associated with its holder has been exceeded and then to debit the account to which the card relates (via its microprocessor if it is a smartcard and the relevant banking network) for the amount charged for the product selected. In the case of a "dumb" magnetic card, a similar procedure is adopted.

Figure 9:
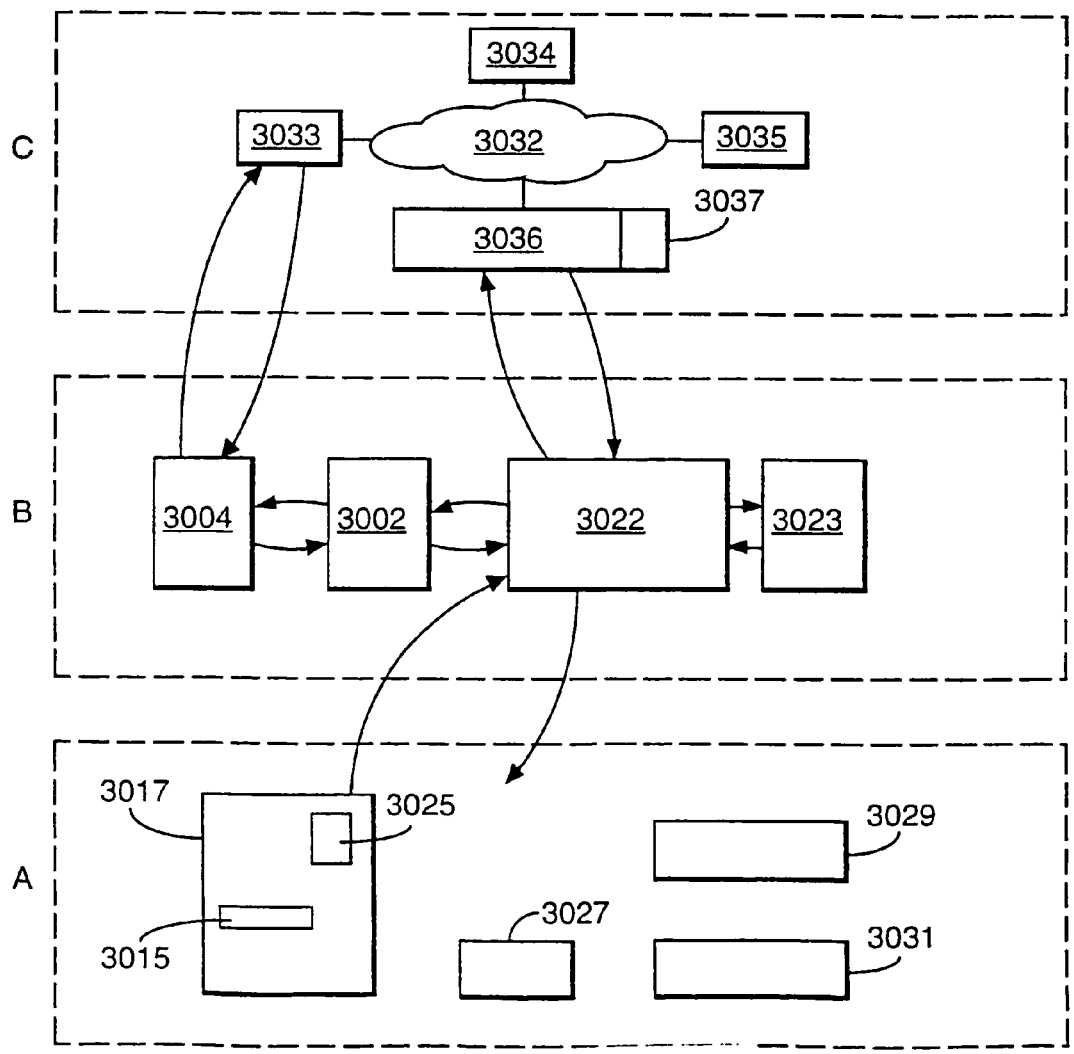
FIG. 9 is a diagrammatic representation of the protocols used in end user payments by credit/bank card.

FIG. 9 illustrates in diagrammatic form the protocol which is used to enable the credit/bank card 3017 to interact with the system, the object of the protocols being to provide financial security. This protocol is based on the protocol presently used in the MINITEL system which operates in France.

The protocol operates in relation to three distinct areas, the end user or subscriber's termination area generally indicated at A, the system provider's area, generally indicated at B and the bank's area generally indicated at C. In FIG. 4 the areas A, B and C are intended to indicate the operational division of the system rather than any physical characteristics.

As indicated earlier with respect to FIG. 8, the user has a credit card 3017 which includes a microprocessor 3025, in the form of an integrated circuit chip. This may also have a so-called private key 3015 having a similar security function to that already described in relation to the user's smartcard 3020, for use in verifying the authenticity of the card.

In connection with its interaction with the credit card 3017, the end user's receiver/decoder 2020 is functionally provided with means for processing data representative of the transaction itself (shown at 3029) and means for processing data relating to authentication and integrity (shown at 3031). Area A also includes a public key.

The area B which is under the control of the system provider includes the SMS 3004 and communications server 3022 described presently with respect to FIGS. 1 and 2. The servers 3022 also include a crypto server 3023 which incorporate a private key.

The area C includes a private banking network 3032, typical bank members of which are shown at 3033, 3034 and 3035. The network 3032 incorporates a telepayment manager 3036 which incorporates a "mother" key 3037.

The sequence of events which are involved in a single financial transaction using the credit card 3017 will now be described with reference to FIG. 9 in which the arrows indicate the various steps involved in carrying out the payment and releasing/injecting the relevant EMM to be received by the end user's receiver/decoder 2020.

Insertion of the "smartcard" credit card 3017 into the receiver/decoder 2020 causes the following to occur as described hereunder; it is to be noted that all of the steps typically occur in real time, unless otherwise stated below:

a) Initial information is collected from the card 3017 by the receiver/decoder 2020. This information includes the card number, information on the card validity date, the country language, the money unit and so on. This information is loaded into the RAM memory of the receiver/decoder.

b) Once loaded, a check on the information is made. If the information is correct, the procedure continues; otherwise the transaction is aborted.

c) The user's PIN number is entered using the remote controller 2026, in a manner described later.

d) The card verifies the PIN number. If the number is correct, the procedure continues. If incorrect, the card provides, say, two or three further attempts. If the number is still incorrect on these further attempts, then the transaction is aborted.

e) If the PIN number is correct, the card opens certain further memory areas, and information from these areas is downloaded to the RAM memory of the receiver/decoder. Such information may be the transactions performed with the card, and their monetary value.

f) A check is made as to whether the transactions would take the user over the relevant credit limit.

g) If positive (i.e. not over the relevant limit), the card is then passed certain information about the current transaction, such as the price, day, bank details and so on.

h) With this information, the card computes a first numeric certificate validating the transaction. The numeric certificate is generated by the card microprocessor by means of a protocol which uses the transaction price, day, card number, card expiry date, product reference and like information to generate the certificate, which is typically of 30 or 40 bytes in length.

i) The transaction details are written into the bank/credit card.

j) The card is turned off; this is important, since it is not desirable that the card be kept open for any of the further steps.

k) Connection is established with the communications servers 3022 of the SAS 3002 by means of the modemmed back channel 4002.

l) In order for the receiver/decoder to verify the SAS, a random number (or ALEA) is generated by the receiver/decoder and sent to the communications servers 3022.

m) The random number is encrypted using an encryption algorithm by the crypto server 3023 and sent back to the receiver/decoder.
n) The receiver/decoder decrypts the random number to check that it is correct.
o) Provided that the SAS is verified, the SAS (and in particular the Order Centralized Server 3207 (see FIG. 5)) checks with the SMS 3004 to confirm that the particular subscriber is not on any blacklist.
p) An optional check is made against a database held, perhaps, in the broadcast centre, as to whether the requested product is available.
q) Provided that no problems are identified, the transaction details and first certificate are sent by the communications servers 3022 to the telepayment manager 3036 in the bank's private network 3032.
r) The credit status of the end user is checked and assuming this is satisfactory the telepayment manager 3036 issues a numeric certificate to the communications servers 3022, calculated in the same manner as for the first certificate. This second certificate is the telepayment manager's authorization of the purchase. It is to be noted that the second certificate may not always be required, for example if the transaction value is under some threshold, and in these circumstances no connection to the telepayment manager need be made.
s) The receipt by the operator of the second certificate (typically as an electrical signal) is a guarantee to the operator of payment by the bank, and hence the SAS then sends the appropriate EMM to the receiver/decoder 2020 to authorize the purchase (if the purchase is of a programme event etc.).
t) Receipt by the receiver/decoder 2020 of the EMM enables the end user to view the selected PPV product on his/her television set 2022 or to download a selected PPF product onto the end user's personal computer.
u) Not in real time, the SAS sends a signal to the SMS 3004 advising of the transaction.
v) Not in real time, the SMS sends the transaction information to the relevant bank 3033, 3034 or 3035, to advise that payment has been accepted. The bank takes the necessary action.

Details have been provided above of how PPV or PPF can be implemented using a credit or bank card. In addition to this, the same bank or credit card reader can be used to authorise other transactions, for example purchase of goods or services in association with the Teleshopping application and to enable the end user to view and modify details of his or her bank account in association with the Telebanking application.

Remote Controller

Figure 7:
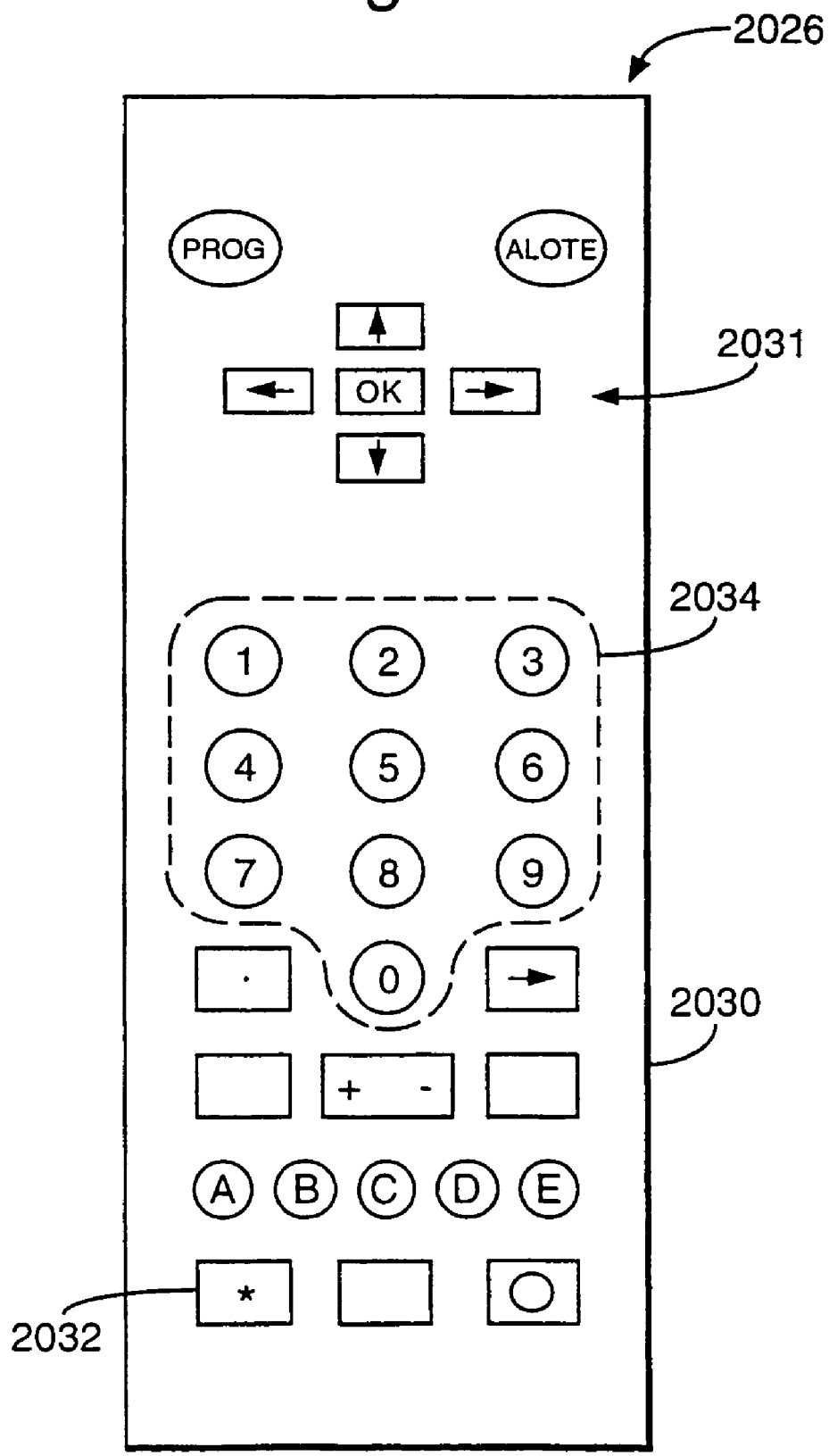
FIG. 7 is a schematic diagram of a remote controller used in the digital television system.
Figure 10:
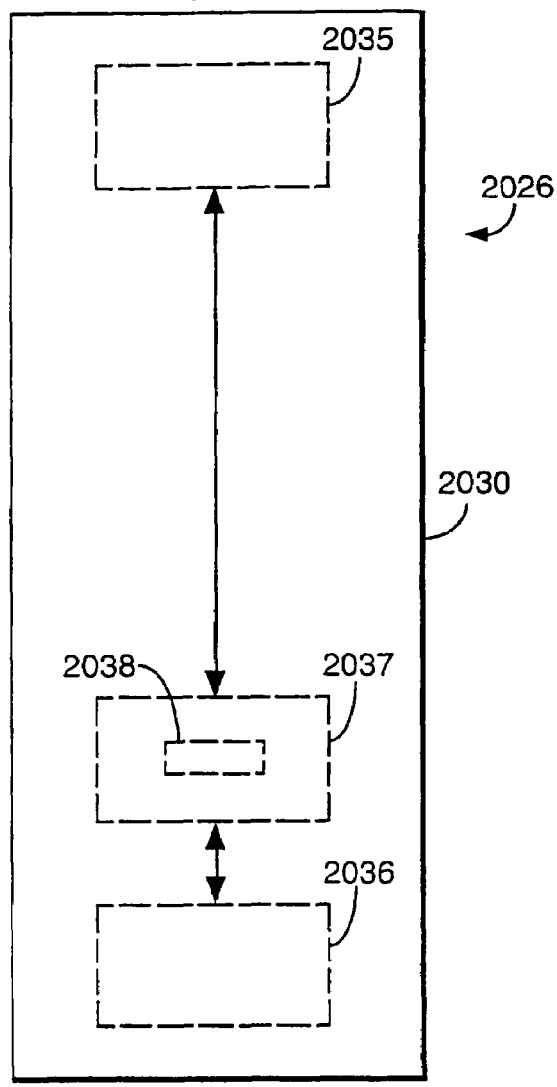
FIG. 10 is a view similar to FIG. 7 but showing in ghost the key internal components of the controller.

With particular reference to FIGS. 7 and 10, an infra-red controller 2026 comprises a casing 2030 on the top surface of which are a number of buttons, most notably control keys 2031, a Mute key 2032 and a numeric keypad 2034 with buttons numbered "0" to "9".

The casing houses means 2035 for generating and transmitting an infra-red beam (in the preferred embodiment an infra-red device operating according to the Phillips RC5 standard), a memory 2036 comprising both EEPROM (and/or FLASH memory) and RAM, and a control means 2037 including encryption means 2038. The memory 2036, which is relatively small, is used to store (in EEPROM) various passwords and other identifiers (as will shortly be described), and (in RAM) variables used during various calculations. The control means is largely conventional, and comprises, at the hardware level, a single chip microprocessor such as is available from Phillips for remote controllers, and, at the software level, software resident in the memory 2036 and capable of the functions shortly to be described (such as addition and modulo functions).

In overview, the hand-held remote controller as described herein is firstly capable of transmitting a user's PIN number to the television system, typically via a decoder, and secondly the remote controller is also provided with means to encrypt the number being transmitted, in particular by calculating a random number sequence. Encryption is particularly important in the context of using a credit or bank card with the receiver/decoder.

As far as providing security for the transmitted PIN number is concerned there are a number of ways that this can be done. In particular, various protocols can be adopted and various different ways of actually effecting the encryption can be used.

Figure 11:
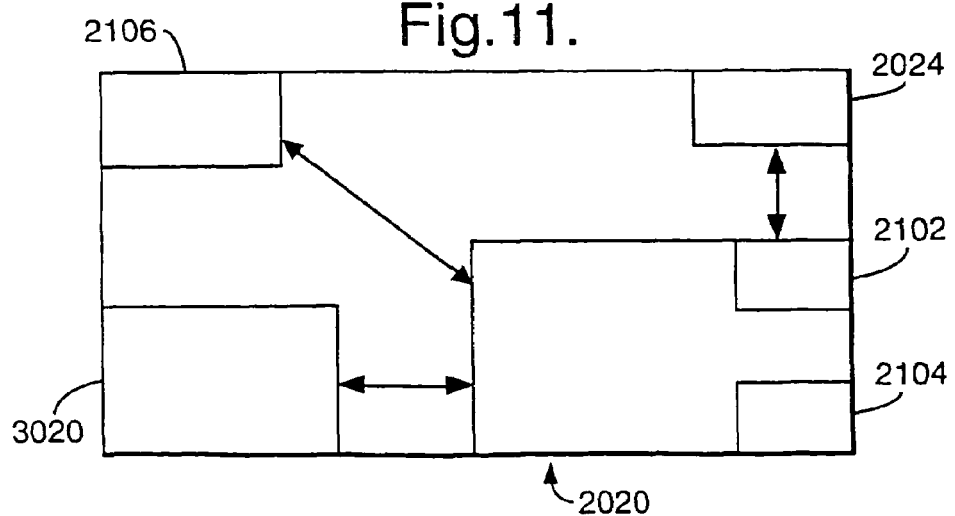
FIG. 11 is a schematic diagram showing the key internal components of the receiver/decoder.

Reference is now made to the description of the system with reference to FIG. 2 and in particular that part of the system which involves the so-called mother and daughter smartcards. Reference is also made to the schematic diagram of internal components of the receiver/decoder shown in FIG. 11.

The particular features of the hand-held infra-red controller of relevance in the present context are concerned with the accessing of the daughter smartcard 3020 and or credit/bank card 3017 by the receiver/decoder 2020. The receiver/decoder 2020 is under the control of control means 2100 which is located in the decoder and is implemented in a combination of microprocessor based hardware and software. The control means includes random number generating means 2102 and means 2104 for outputting the random number to a television screen, typically on the television set 2022. The decoder also includes, in one preferred embodiment, infra-red receiving means 2106 (in the preferred embodiment an infra-red device operating according to the Phillips RC5 standard) for communication with the infra-red controller. However, in another embodiment the decoder includes both infra-red receiving and transmitting means, if transmission to the controller is desired. As mentioned earlier, the receiver/decoder also includes memory 2024, which, as in the case of the remote controller, comprises both EEPROM/FLASH and also RAM. Use of the memory is analogous to that described above in relation to the remote controller.

FIGS. 12 to 15 illustrate a number of encryption protocols which can be used.

Figure 12:
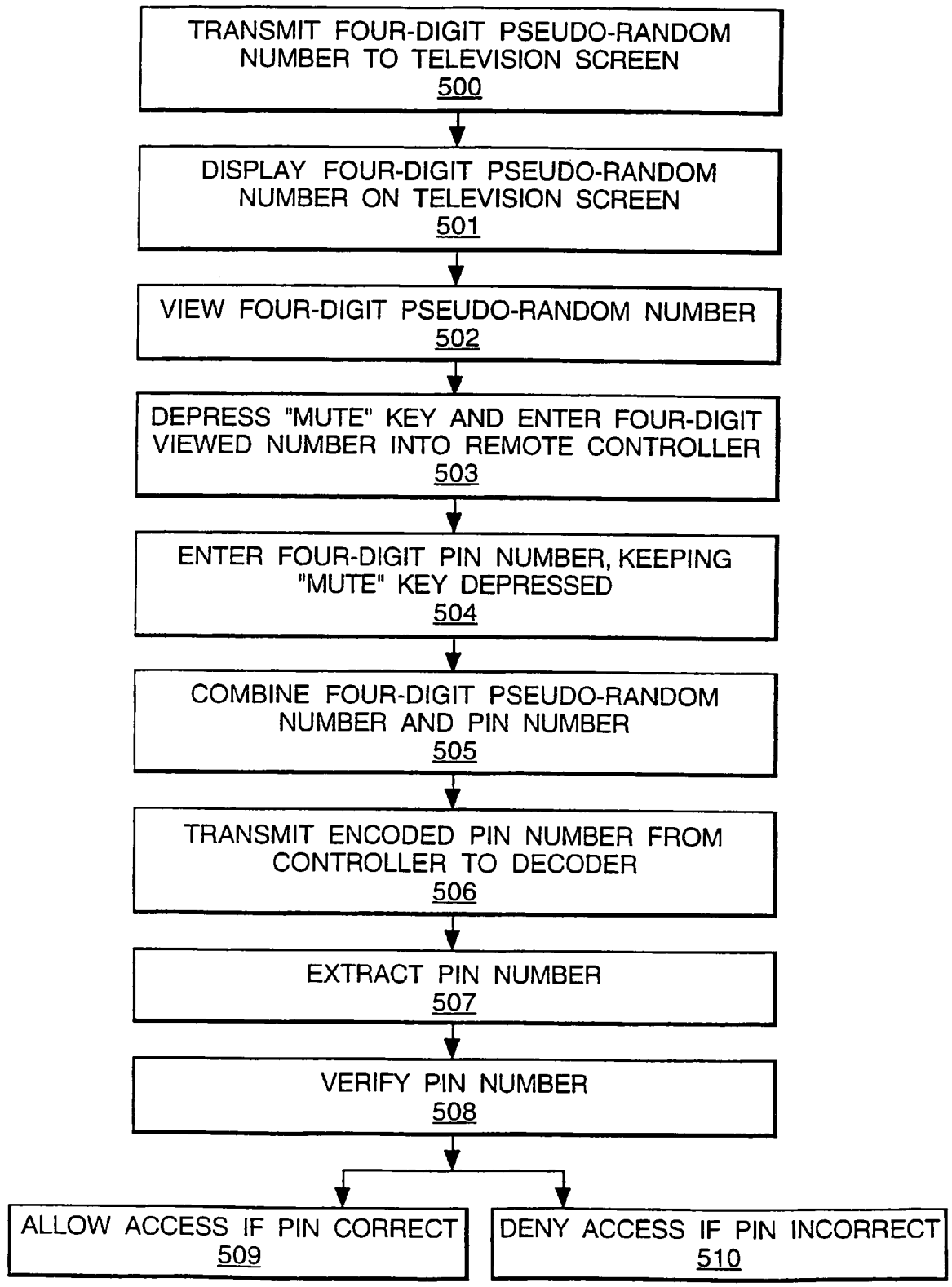
FIG. 12 is a diagrammatic representation of a first encryption arrangement according to the present invention.

With reference to FIG. 12, in the first encryption protocol the decoder 2020 under the control of the control means 2100 located in the decoder transmits an electromagnetic signal to a television screen which in turn displays a four-digit sequence $a_1, a_2, a_3, a_4$ from 0000 to 9999, this step being shown at 500 in FIG. 12.

This four-digit number may either be an entirely randomly generated four-digit number, which is varied each time the system is accessed by the end user, or it may be a predetermined number of pre-determined random numbers. An associated message is displayed requesting the user to enter the random number into the controller 2026.

The display of this number and associated message is indicated at step 501.

The user then views the random number $a_1, a_2, a_3, a_4$ on the television screen 2022 at step 502 and enters that number into the remote controller 2026, at the same time as depressing the Mute key 2032, at step 503.

In the preferred embodiment, entry is by means of the numeric key pad 2034. Alternatively, entry may be by means of any suitable input means such as by voice activation.

Again acting on a message from the television screen, the user then enters his own PIN number, using the numeric keypad 2034, into the controller 2026. The PIN number is also a four digit number $c_1,c_2,c_3, c_4$ and is the PIN number which also applies to the daughter smartcard 3020 and/or bank or credit card 3017. The steps 503 and 504 are carried out while the mute key 2032 is held depressed by the user.

The next step involves the controller 2026 in effect combining the two four-digit numbers $a_1, a_2,a_3,a_4$ and $c_1,c_2,c_3,c_4$ to produce the encrypted four-digit number $t_1, t_2,t_3,t_4$.

The way in which the digits $t_1,t_2,t_3$ and $t_4$ are calculated will now be described.

Each of the digits is calculated in the same way but reference is now only made to digit $t_1$.

$t_1$ is calculated from the digits $a_1$ and $c_1$ in accordance with the expression:

$$t_1=(a_1+c_1) \bmod 10$$

where "mod 10" means that the base 10 module of $(a_1+c_1)$ is taken; in other words, the least significant digit from the result of the addition is taken.

As indicated earlier similar calculations are made in respect of $t_2,t_3$ and $t_4$. The digits $c_1,c_2,c_3$ and $c_4$ are thus ciphered so as to safeguard against their interception as a result of the remote controller transmitting the user's PIN number to the decoder 2020.

The step just described is indicated at 505 in FIG. 12.

The encrypted number $t_1,t_2,t_3,t_4$ is then transmitted from the remote controller to the decoder, this being shown in step 506 in FIG. 12.

Upon receipt of the encrypted four-digit number the decoder in effect extracts the original four-digit PIN number $c_1,c_2,c_3,c_4$. This is done by calculating each of the digits $c_1,c_2,c_3,c_4$ from $t_1,t_2,t_3$ and $t_4$, this step being shown at 507 in FIG. 12. The calculation is performed, with reference to digit $c_1$, as follows.

$$c_1=(t_1-a_1+10) \bmod 10$$

A corresponding formula applies to the other digits.

In the case of the daughter smartcard 3020, the next step is for the receiver/decoder to compare the extracted PIN number with that already stored in the decoder and representative of the daughter smartcard 3020. In fact each of the digits $c_1,c_2, c_3,c_4$ are compared in turn with the corresponding digits stored in the decoder. This step is shown at 508 in FIG. 12.

The final steps shown at 509 and 510 in FIG. 12 involve access being gained to the system if the two four-digit numbers match (step 509) and access being denied if they do not match (step 510).

In the case of the bank or credit card 3017 having its own microprocessor (a so-called "smartcard") a different procedure is followed. In step 508 the extracted PIN number is passed to the smartcard for checking as to whether the PIN number is valid. If it is (step 509), authorization for the relevant transaction is gained and a relevant (first) certificate is issued, as described above. If it is not (step 510), authorization is denied.

The way in which the steps 503 to 506 are executed will now be described in more detail with regard to the following table in which $a_1,a_2,a_3,a_4,c_1,c_2,c_3$ and $C_4$ are the decimal codes each of which is between "0" and "9". If the user releases the mute button 2032 during the following steps shown in the table the unfolding of the sequence is halted. It is then necessary to recommence the whole operation. It is noted that the trial Mute code is transmitted upon release on the part of the user of the Mute key.

| BUTTON SELECTED | CODE TRANSMITTED BY CONTROLLER |
| --- | --- |
| Mute | Mute |
| Mute + ($a_1$) | None |
| Mute + ($a_2$) | None |
| Mute + ($a_3$) | None |
| Mute + ($a_4$) | None |
| Mute + ($c_1$) | $t_1$ = modulo 10 of ($a_1 + c_1$) |
| Mute + ($c_2$) | $t_2$ = modulo 10 of ($a_2 + c_2$) |
| Mute + ($c_3$) | $t_3$ = modulo 10 of ($a_3 + c_3$) |
| Mute + ($c_4$) | $t_4$ = modulo 10 of ($a_4 + c_4$) |
| None (release Mute key) | Mute |

Figure 13:
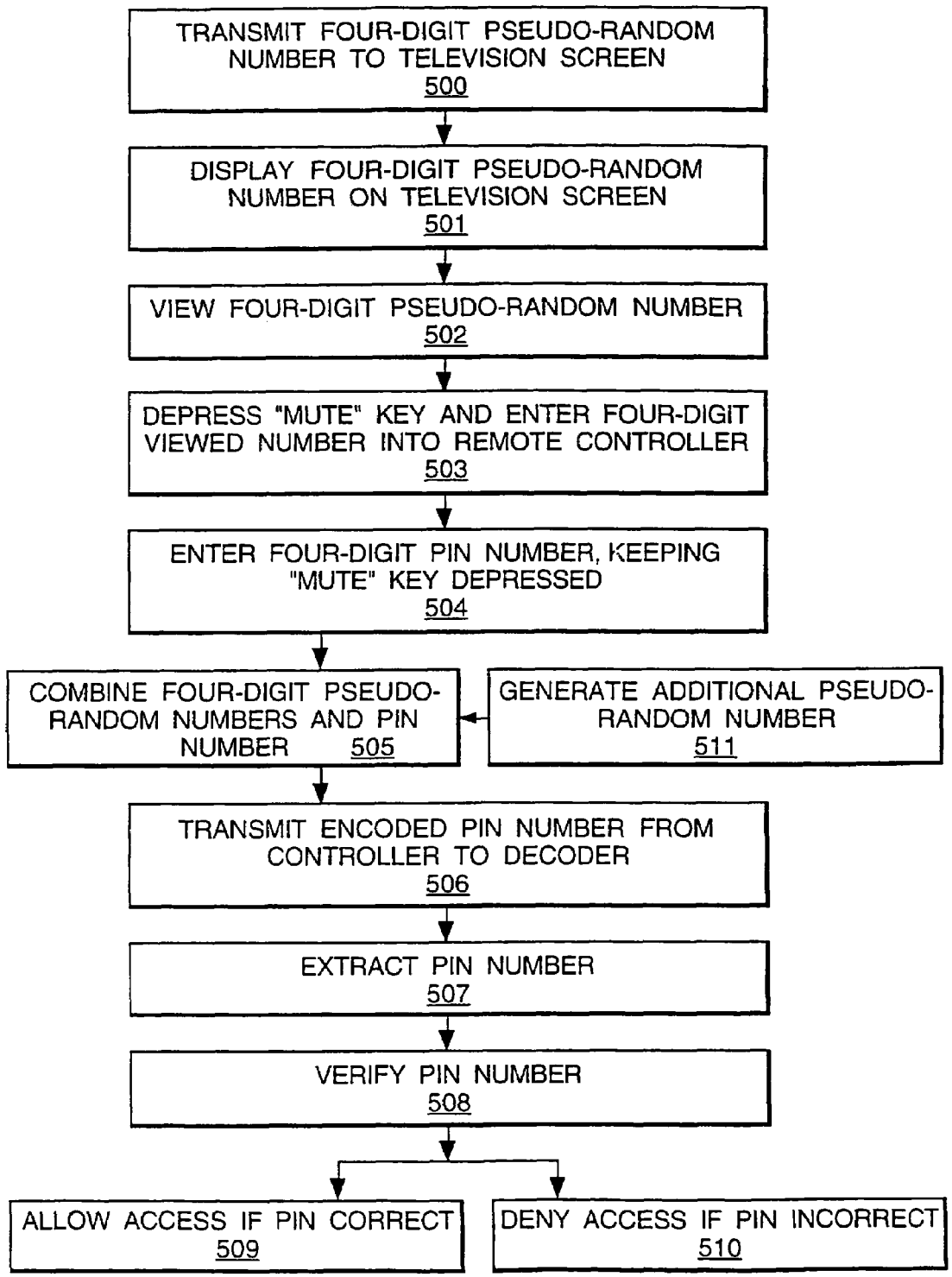
FIG. 13 is a view similar to FIG. 12 of a second encryption arrangement.

With reference to FIG. 13, there is herein illustrated a second encryption protocol which is basically the same as that already described with reference to FIG. 12. However in the protocol of FIG. 13 an additional security step is added.

This is shown at 511 and involves an additional random number being stored in the memory both of the remote controller and the control means 2100 of the receiver/decoder 2020. Such a number would in fact be stored typically only on first use of the controller.

This additional random number $d_1,d_2,d_3,d_4$ is combined with the first random number $a_1,a_2,a_3,a_4$ and the PIN number $c_1,c_2,c_3,c_4$ to produce the encrypted number $t_1,t_2,t_3,t_4$.

This additional step 511 thereby provides enhanced security when compared with the protocol of FIG. 12.

Figure 14:
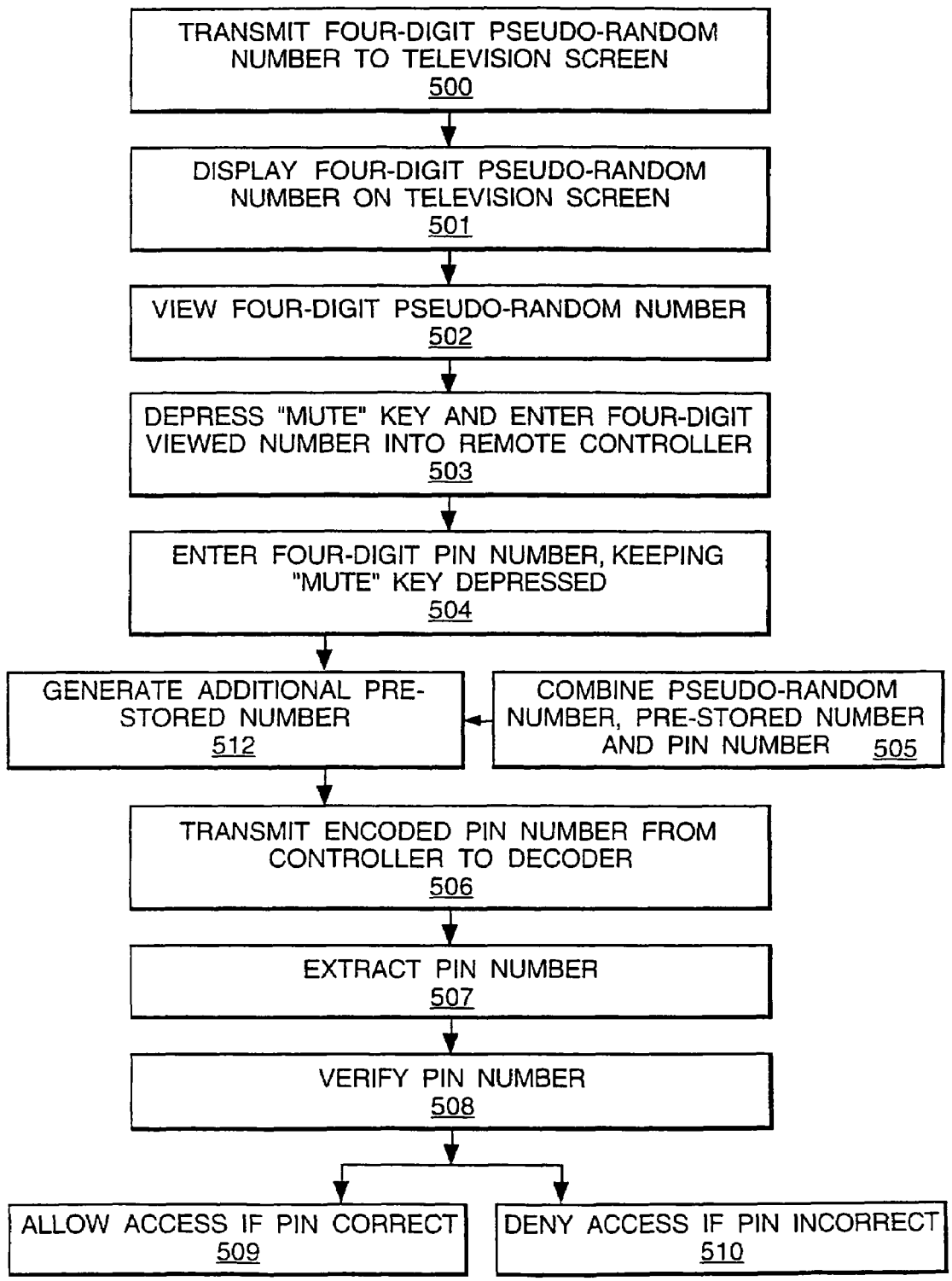
FIG. 14 is a view similar to FIG. 12 of a third encryption arrangement.

FIG. 14 illustrates a third encryption protocol which is substantially the same as FIG. 12 but with a further step 512.

In this protocol the remote controller's memory 2036 has pre-stored in it a four-digit number $e_1,e_2,e_3,e_4$ which is characteristic of the identity of that particular remote controller 2026.

This additional identity number is combined at step 505 with the random number $a_1,a_2,a_3,a_4$ and the user's PIN number $c_1,c_2,c_3,c_4$ to produce the encrypted number $t_1,t_2,t_3,t_4$.

The control means 2100 of the receiver/decoder 2020 has means whereby the identity number of the specific remote controller $e_1,e_2,e_3,e_4$ can be compared with that of the receiver/decoder in the system so that, if it does not match, it means that the controller is not the correct one for that particular receiver/decoder which means in turn that the daughter smartcard 3020 and/or bank or credit card 3017 (as the case may be) cannot be accessed by the receiver/decoder 2020.

Although FIG. 14 illustrates the addition of the step 512 to the steps shown in FIG. 12 it could also provide an additional step to the protocol shown in FIG. 13 thus even further enhancing the security being provided. Thus the encryption protocols illustrated in FIGS. 12, 13 and 14 provide successively increasing degrees of security.

A fourth encryption protocol is now described which combines the additional random number feature and the additional identity number feature described above. One particular advantage of the combination is that it permits more than one remote controller (each with a different additional random number) to be used with the same receiver/decoder, given that a distinct additional identity number is available for each such controller.

The manner in which the two features are combined is now described with reference to the sequence of remote controller button operations shown in the following table.

| BUTTON SELECTED | CODE TRANSMITTED BY CONTROLLER |
|---|---|
| Mute | Mute |
| Mute + ($a_1$) | None |
| Mute + ($a_2$) | None |
| Mute + ($a_3$) | None |
| Mute + ($a_4$) | None |
| Mute + ($c_1$) | $t_1$ = modulo 10 of ($a_1 + c_1 + d_1$) |
| Mute + ($c_2$) | $t_2$ = modulo 10 of ($a_2 + c_2 + d_2$) |
| Mute + ($c_3$) | $t_3$ = modulo 10 of ($a_3 + c_3 + d_3$) |
| Mute + ($c_4$) | $t_4$ = modulo 10 of ($a_4 + c_4 + d_4$) |
| Mute | One time Mute |
| Mute | One time $e_1$ |
| Mute | One time $e_2$ |
| Mute | One time $e_3$ |
| Mute | One time $e_4$ |
| None (release Mute key) | One time Mute |

It is noted firstly that compatibility with the first encryption protocol (described with reference to FIG. 12), is provided, so that the remote controller can if desired communicate with a receiver/decoder which is only capable of operating according to the first encryption protocol (by setting $d_1$ to $d_4$ to zero). Compatibility is provided by automatically transmitting the Mute code immediately $t_1$ etc. have been transmitted. Thus a decoder operating according to the first encryption protocol will receive all the code necessary for it to function successfully.

After the transmission of the Mute command for the second time, the controller transmits the additional identity number $e_1$ etc., before eventually transmitting a final Mute code on release of the Mute key on the part of the user.

In the fourth encryption protocol, the additional random number $d_1$, etc. is combined with the first random number $a_1$, etc. and the PIN number $c_1$, etc. in the following manner (with reference by way of example to $t_1$)

$$t_1 = (a_1 + c_1 + d_1) \bmod 10$$

The additional random number is retrieved by the receiver/decoder in the following manner (with reference by way of example to $c_1$)

$$c_1(t_1 - (a_1 + d_1) + 10) \bmod 10$$

Still with reference to the above table, description is now provided as to how the additional random number and additional identity number are first generated and stored.

The random number is generated by the receiver/decoder in the same way as the first random number ($a_1$, etc.). However, the additional random number ($e_1$, etc.) is only generated once; it is subsequently stored in the flash memory 4024 of the decoder for use whenever it is sought to input a PIN number using the remote controller.

The additional identity number ($e_1$, etc.) is generated by the receiver/decoder as a further random number, and again stored in the flash memory 4024 for future use.

The first time that the remote controller is used (and any initial time after a change of battery has erased the memory 2036), $d_1$ etc. and $e_1$ etc. are set to zero. The control means 2100 of the receiver/decoder compares the value of $e_1$ etc. with zero and the result of the comparison is positive. Hence the control means generates a message for display on the television screen requesting the user to input values, always with the Mute key depressed, according to the following table.

| BUTTON SELECTED | CODE TRANSMITTED BY CONTROLLER |
|---|---|
| Mute | Mute |
| Mute + Pilote | Pilote |
| Mute + ($d_1$) | $d_1$ |
| Mute + ($d_2$) | $d_2$ |
| Mute + ($d_3$) | $d_3$ |
| Mute + ($d_4$) | $d_4$ |
| Mute + ($e_1$) | $e_1$ |
| Mute + ($e_2$) | $e_2$ |
| Mute + ($e_3$) | $e_3$ |
| Mute + ($e_4$) | $e_4$ |
| Mute + Progr | Progr |
| None (release Mute key) | One time Mute |

The "Pilote" and "Progr" keys 2031 are chosen because they have no function relevant to the present exercise. However, any other suitable keys could be chosen.

It will be noted from the table that the user is requested to input the values of $d_1$ etc. and $e_1$ etc., as output from the control means and read from the television screen. On depressing the Progr key for the second time, the memory 2036 of the remote controller stores these two sets of values (that is of the additional password and the additional identity number).

For the second and subsequent times that the remote controller is used, the stored, non-zero, values of the additional password and the additional identity number are output by the remote controller. The control means of the receiver/decoder compares the additional identity number with zero and arrives at a negative result. Given the negative result, the control means proceeds to evaluate $c_1$ etc. given the values of $a_1$ etc. $t_1$ etc. and $d_1$ etc. Provided that the values of $c_1$ etc. are incorrect, the control means then authenticates the PIN number, and further processing proceeds as described previously. Otherwise, authentication is refused.

It can be understood that the fourth encryption protocol provides several advantages. Firstly, it is more secure, by virtue of the use of the additional password (which is only changed relatively infrequently) and by virtue of the use of the additional identity number. Secondly, it can cope with the use of many controllers for one receiver/decoder; the procedure for the storage of the additional password and additional identity number in the remote controller can be applied to more than one remote controller. Thirdly, the remote controller can communicate effectively with receiver/decoders which can only operate according to the first protocol, by virtue of the use of common codes.

Figure 15:
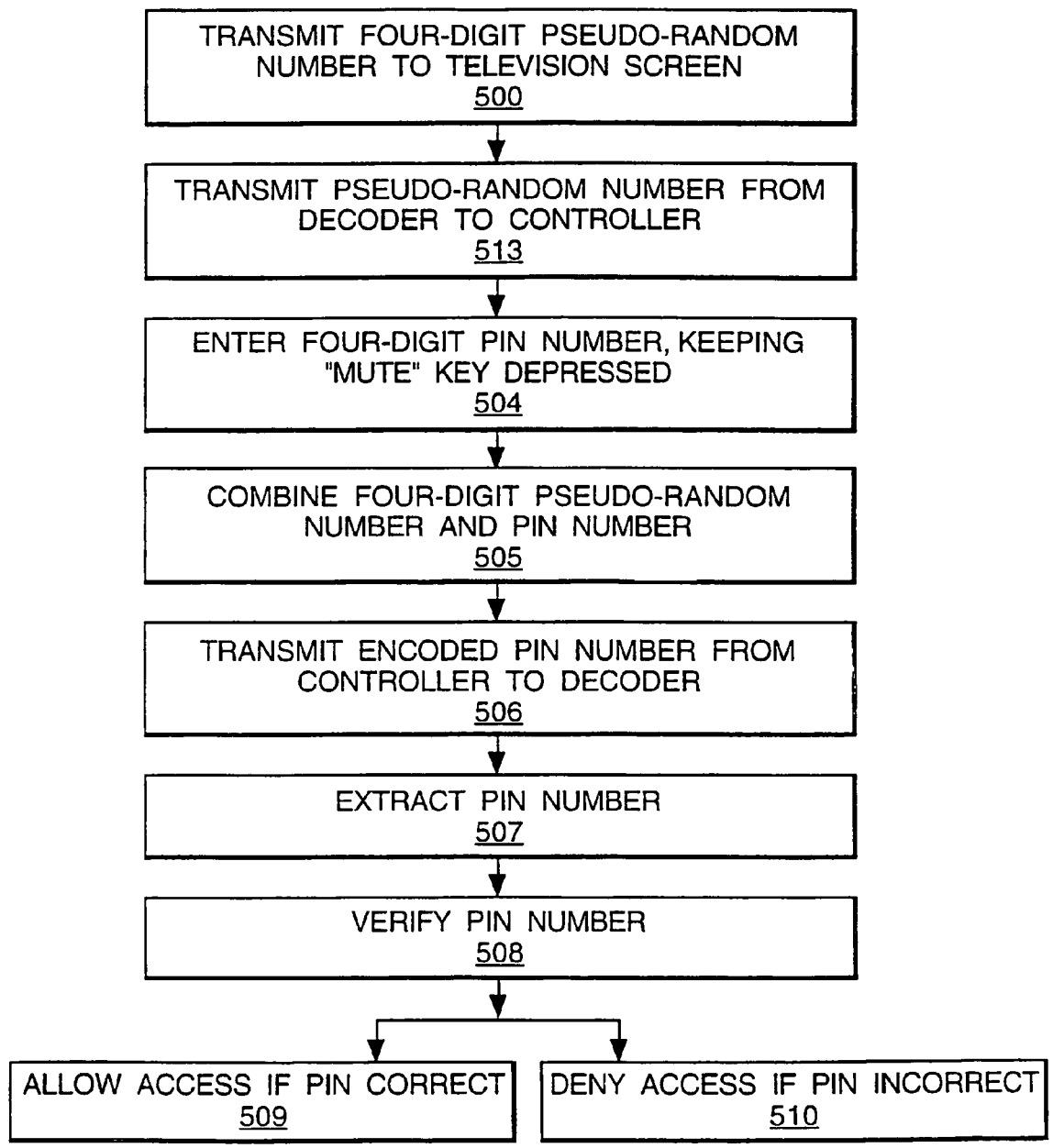
FIG. 15 is a view similar to FIG. 12 of a fifth encryption arrangement.

As indicated one of the objectives is to try and make life as simple as possible for the user by reducing the number of actions which the user has to take in order to effect a financial transaction using the remote controller 2026. FIG. 15 illustrates a further (fifth) encryption protocol which simplifies the actions which need to be taken by the user. In this protocol the receiver/decoder 2020 first generates the random number $a_1, a_2, a_3, a_4$ at step 500. However, unlike the protocol of FIGS. 12 to 14 the decoder 2020 then transmits via infra-red the random number $a_1, a_2, a_3, a_4$ to the controller 2026 where it is stored in the controller's memory 2036. This is instead of displaying the random number $a_1, a_2, a_3, a_4$ on the television screen.

The remaining steps of the protocol are the same as steps 504 to 510 in FIG. 14.

With this arrangement the user only has to enter one four-digit number, namely the user's PIN number $c_1, c_2, c_3, c_4$, instead of having to enter two four-digit numbers as in the protocol of FIG. 14. However, some security is lost in that the decoder transmits the random number by infra-red. This transmission could conceivably be intercepted.

A number of different ways can be employed for encrypting the four-digit number to be transmitted from the remote controller 2026 to the decoder 2020. However, the modulo function is viewed as being sufficiently secure for the present purposes.

It will be understood that the present invention has been described above purely by way of example, and modifications of detail can be made within the scope of the invention.

Each feature disclosed in the description, and (where appropriate) the claims and drawings may be provided independently or in any appropriate combination.

In the aforementioned preferred embodiments, certain features of the present invention have been implemented using computer software. However, it will of course be clear to the skilled man that any of these features may be implemented using hardware. Furthermore, it will be readily understood that the functions performed by the hardware, the computer software, and such like are performed on or using electrical and like signals.

Cross reference is made to our co-pending applications, all bearing the same filing date, and entitled Signal Generation and Broadcasting (Attorney Reference no. PC/ASB/19707), Smartcard for use with a Receiver of Encrypted Broadcast Signals, and Receiver (Attorney Reference No. PC/ASB/19708), Broadcast and Reception System and Conditional Access System therefor (Attorney Reference No. PC/ASB/19710), Downloading a Computer File from a Transmitter via a Receiver/Decoder to a Computer (Attorney Reference No. PC/ASB/19711), Transmission and Reception of Television Programmes and Other Data (Attorney Reference No. PC/ASB/19712), Downloading Data (Attorney Reference No. PC/ASB/19713), Computer Memory Organisation (Attorney Reference No. PC/ASB/19714), Television or Radio Control System Development (Attorney Reference No. PC/ASB/19715), Extracting Data Sections from a Transmitted Data Stream (Attorney Reference No. PC/ASB/19716), Access Control System (Attorney Reference No. PC/ASB/19717), Data Processing System (Attorney Reference No. PC/ASB/19718), and Broadcast and Reception System, and Receiver/Decoder and Remote Controller therefor (Attorney Reference No. PC/ASB/19720). The disclosures of these documents are incorporated herein by reference. The list of applications includes the present application.

The invention claimed is:

1. A receiver/decoder for use in reception of a television or radio programme or a data file broadcast by a remote centre, the receiver/decoder comprising:
    a first means for interacting with a user's credit or bank card to read first information carried by the user's credit or bank card;
    a second means, separate from said first means, for interacting with a user's smartcard to read second information carried by the user's smartcard, said second information being modifiable remotely by said remote centre in response to a payment via the user's credit or bank card; and
    means for transmitting to a remote centre a debit instruction, based on the first information carried by the user's credit or bank card,
        wherein said second information includes at least one of subscription right information and deciphering information,
    and wherein the receiver/decoder is arranged to send debit instructions to the remote centre and to modify at least one of subscription right information and deciphering information stored in the user's smartcard in response to payment by means of the user's bank or credit card while both the first means and the second means are simultaneously invoked.

2. The receiver/decoder according to claim 1, arranged to interact with the user's credit or bank card, wherein the user's credit or bank card incorporates a microprocessor.

3. The receiver/decoder according to claim 1, arranged to provide said first information to the microprocessor.

4. The receiver/decoder according to claim 1, further including means arranged to receive authorization information from a remote centre.

5. The receiver/decoder according to claim 1, arranged to control decoding or descrambling of the television or radio programme or the data file in dependence on the authorization information.

6. The receiver/decoder according to claim 1, arranged to allow a plurality of products to be purchased for each transaction in which a debit instruction of the debit instructions is sent to the remote centre.

7. The receiver/decoder according to claim 1, further including means for processing data representative of the user's bank or credit card together with received data representative of an item or service offered, and for transmitting an order request to a remote centre for processing.

8. The receiver/decoder according to claim 7, further including means for inputting a request from a user to purchase the item offered.

9. The receiver/decoder according to claim 1, further including means for receiving a Personal Identification Number (PIN).

10. The receiver/decoder according to claim 1, wherein the receiver/decoder is in the form of a set-top-box.

11. The receiver/decoder according to claim 1, wherein the receiver/decoder is adapted for reception of satellite transmitted programmes or files.

12. The receiver/decoder according to claim 1, further comprising a remote controller for transmitting a user's Personal Identification Number (PIN) to the receiver/decoder.

13. The receiver/decoder according to claim 12, wherein the remote controller includes security means for rendering the transmission secure.

14. A receiver/decoder for use in a digital satellite television system comprising:
    a first means to accommodate a credit or bank card carrying a microprocessor;
    means to interact with said microprocessor when the credit or bank card is inserted into an operative position in said receiver/decoder in order to enable data carried by said credit or bank card to be read and data to be input to the microprocessor carried by said credit or bank card;
    a second means separate from said first means to accommodate a smartcard comprising smartcard data, whereby insertion of the smartcard by an end user into the receiver/decoder enables the smartcard to interact with means in said receiver/decoder, wherein a product selected by the end user may be delivered to said receiver/decoder and from there to a television set or personal computer to which the receiver/decoder is adapted to be connected, information stored on the smartcard being modifiable in response to payment via the credit or bank card; and means for transmitting to a remote centre a debit instruction, based on the data carried by the user's credit or bank card, wherein said smartcard data includes at least one of subscription right information and deciphering information, wherein the receiver/decoder is arranged to send the debit instruction to the remote centre and to modify at least one of subscription right information and deciphering information stored in the user's smartcard in response to payment by means of the user's bank or credit card while both the first means and the second means are simultaneously invoked.

15. A digital satellite radio or television system having a plurality of end user terminations each of which includes a receiver/decoder as claimed in claim 14.

16. A method of providing an order for an item or service comprising:

reading account information from a bank or credit card at a receiver/decoder at which information concerning the item or service is received;

generating an order request containing information identifying the item or service and said account information from the bank or credit card information;

verifying a remote centre; and following verification, transmitting order information to the remote centre for processing, wherein the receiver/decoder comprises:

a first means to accommodate the credit or bank card carrying a microprocessor;

means to interact with said microprocessor when the credit or bank card is inserted into an operative position in said receiver/decoder in order to enable data carried by said credit or bank card to be read and data to be input to the microprocessor carried by said credit or bank card;

a second means separate from said first means to accommodate a smartcard comprising smartcard data including at least one of subscription right information and deciphering information;

means for transmitting to a remote centre a debit instruction, based on the data carried by the user's credit or bank card;

means for sending the debit instruction to the remote centre and for modifying at least one of subscription right information and deciphering information stored in the smartcard in response to payment by means of the user's bank or credit card while both the first means and the second means are simultaneously invoked, wherein the verifying comprises:

inputting a random number by a user;

passing the random number to the remote centre;

receiving the random number in an encrypted form from the remote centre; and decrypting the encrypted random number to verify the remote centre.

17. The method according to claim 16, further comprising, at the remote centre, processing the order information and determining whether to authorize a transaction on a basis of the bank or credit card information.

18. A remote controller for an item of equipment, comprising:

transmission means for transmitting a user's Personal Identification Number (PIN) to said item of equipment; and encryption means for encrypting the PIN, wherein the encryption means comprises means for combining the PIN with a random number and passing the thus-encrypted PIN to said transmission means for subsequent transmission thereby, wherein said item of equipment comprises:

a receiver/decoder for use in reception of a television or radio programme or a data file;

first means for interacting with a user's credit or bank card to read credit or bank information carried by the user's credit or bank card;

second interacting means, separate from said first interacting means, for interacting with a user's smartcard to read information carried by the user's smartcard; and means for transmitting to a remote centre a debit instruction, based on the first information carried by the user's credit or bank card, wherein said second information includes at least one of subscription right information and deciphering information, and wherein the receiver/decoder is arranged to send debit instructions to the remote centre and to modify at least one of subscription right information and deciphering information stored in the user's smartcard in response to payment by means of the user's bank or credit card while both the first means and the second means are simultaneously invoked.

19. The remote controller as in claim 18 in which the transmission means comprises means for generating an infrared beam.

20. The remote controller as claimed in claim 18, further comprising means for enabling the user to input the random number.

21. The remote controller as claimed in claim 18 in which said encryption means comprises means for storing the random number in the controller.

22. The remote controller as claimed in claim 18 in which said encryption means comprises means for generating a number characteristic of the remote controller, for transmission via said transmitting means to the item of equipment.

23. The remote controller as claimed in claim 18 in which said encryption means includes means for generating a number characteristic of the remote controller and means for combining said characteristic number with said random number and said PIN.

24. The remote controller as claimed in claim 18 in which said encryption means comprises means for receiving said random number from said item of equipment and means for combining said random number with the user's PIN for transmission via the transmitting means to said item.

25. A combination comprising the remote controller as claimed in claim 18 and said item of equipment, wherein said item of equipment has means for receiving the user's PIN.

26. The combination as claimed in claim 25 in which said item of equipment comprises means for generating said random number and means for outputting said random number to a display unit.

27. The combination as claimed in claim 25 in which said item of equipment comprises means for generating said random number and means for transmitting said random number to said remote controller.

28. A digital television system, comprising an item of television equipment, said item having means for receiving the user's PIN, and the remote controller as claimed in claim 18.

29. A method of entering the PIN into a television system comprising employing the remote controller as claimed in claim 18 to transmit said PIN to a television.

* * * * *